United States Patent
Wong et al.

(10) Patent No.: US 9,350,708 B2
(45) Date of Patent: May 24, 2016

(54) SYSTEM AND METHOD FOR PROVIDING SECURED ACCESS TO SERVICES

(75) Inventors: Nik Wong, Fremont, CA (US); Nitish John, Sunnyvale, CA (US); Julian Suen, Union City, CA (US)

(73) Assignee: Good Technology Corporation, Sunnyvale, CA (US)

( * ) Notice: Subject to any disclaimer, the term of this patent is extended or adjusted under 35 U.S.C. 154(b) by 884 days.

(21) Appl. No.: 12/791,749

(22) Filed: Jun. 1, 2010
(Under 37 CFR 1.47)

(65) Prior Publication Data

US 2011/0296186 A1    Dec. 1, 2011

(51) Int. Cl.
*H04L 29/06* (2006.01)
*H04W 92/02* (2009.01)

(52) U.S. Cl.
CPC ........ *H04L 63/0272* (2013.01); *H04L 63/0428* (2013.01); *H04L 63/06* (2013.01); *H04L 63/08* (2013.01); *H04L 63/164* (2013.01); *H04L 63/0485* (2013.01); *H04L 63/061* (2013.01); *H04L 63/0884* (2013.01); *H04L 63/0892* (2013.01); *H04L 63/205* (2013.01); *H04W 92/02* (2013.01)

(58) Field of Classification Search
CPC . H04L 63/0272; H04L 63/08; H04L 63/0884; H04L 63/061; H04L 63/0485; H04L 63/205; H04L 63/0892; H04W 92/02
USPC ........ 713/153, 171; 726/12, 15; 380/249, 270
See application file for complete search history.

(56) References Cited

U.S. PATENT DOCUMENTS 7,197,643 B2 * 3/2007 Takase .......................... 713/171
7,882,247 B2 * 2/2011 Sturniolo et al. ............. 709/228
(Continued)

FOREIGN PATENT DOCUMENTS

EP        1993257 A1    11/2008
WO   WO2008/070283 A2   6/2008

OTHER PUBLICATIONS

C. Perkins, IP Mobility Support, Oct. 1996, The Internet Engineering Task Force, Network Working Group, RFC2002, retreived from http://www.ietf.org/rfc/rfc2002.txt on Dec. 6, 2012.*
(Continued)

*Primary Examiner* — Carl Colin
*Assistant Examiner* — Gary Lavelle
(74) *Attorney, Agent, or Firm* — Fish & Richardson P.C.

(57) ABSTRACT

A system and method for providing authenticated access to an initiating terminal in relation to the services provided by a terminating terminal via a communications network are disclosed. In one aspect, a global server comprises a communications module, which receives and processes a key exchange initiation message from the initiating terminal so as to establish an encrypted communications channel with the terminating terminal. The communications module, responsive to a received key exchange initiation message, performs an encrypted communication establishment process in respect of the received key exchange initiation message. The encrypted communication establishment process comprises authenticating the initiating terminal, and in the event that the initiating terminal is successfully authenticated, transmitting keying data corresponding to the received key exchange initiation message to the terminating terminal. The keying data is identified on the basis of data associated with the initiating terminal.

48 Claims, 17 Drawing Sheets

(56) References Cited

U.S. PATENT DOCUMENTS

| | | | |
|---|---|---|---|
| 2006/0020787 A1* | 1/2006 | Choyi et al. | 713/165 |
| 2007/0079368 A1* | 4/2007 | Takeyoshi et al. | 726/15 |
| 2007/0086382 A1* | 4/2007 | Narayanan et al. | 370/331 |
| 2007/0266421 A1* | 11/2007 | Vaidya et al. | 726/1 |
| 2008/0137863 A1* | 6/2008 | Thomas | 380/273 |

OTHER PUBLICATIONS

S. Kent and R. Atkinson, Security Protocol for the Internet Protocol, Nov. 1998, The Internet Engineering Task Force, Network Working Group, RFC2401, retreived from http://www.ietf.org/rfc/rfc2401.txt on Dec. 6, 2012.*

C. Kaufman, Internet Key Exchange (IKEv2) Protocol, The Internet Engineering Task Force, Network Working Group, RFC4306, retreived from http://tools.ietf.org/html/rfc4306 on Dec. 6, 2012.*

Xenakis, et al., On Demand Network-wide VPN Deployment in GPRS, Network, IEEE vol. 16, Issue 6, Nov.-Dec. 2002 pp. 28-37.

International Search Report and Written Opinion issued on Dec. 8, 2011 for International application No. PCT/IB2011/052655.

* cited by examiner

SYSTEM AND METHOD FOR PROVIDING SECURED ACCESS TO SERVICES

FIELD

A system and method for providing an authorised user access to services on a server are disclosed.

DESCRIPTION OF THE RELATED TECHNOLOGY

A virtual private network (VPN) is a communications environment in which access is controlled to permit client connections. A VPN creates a private scope of computer communications and/or provides a secure extension of a private network via an insecure communications network such as the Internet.

Internet Protocol Security (IPsec), Layer 2 Tunnelling Protocol (L2TP) and Secure Sockets Layer (SSL) are examples of encryption protocols that are used to establish VPNs over a communications network, such as the Internet, to ensure secured access to data and services in the VPN to authorised users.

SSL is an application layer protocol, and uses a combination of public-key and symmetric-key encryption for securing the packets. SSL protects the data sent between communicating hosts, but does not protect the identity of the communicating hosts.

L2TP is a tunnelling protocol used to establish VPNs. L2TP does not provide any encryption or confidentiality by itself, and L2TP is often used in combination with the IPsec protocol to provide encryption and confidentiality.

IPsec protocol suite provides security services for traffic at the Internet Protocol (IP) layer. As is well known in the art, the Internet Protocol (IP) packets have no built in security mechanisms. IPsec was designed to enable secured private communication using the IP packets over the IP networks. IPsec suite of protocols enables confidentiality, origin authentication and data integrity. IPsec utilises Authenticated Header (AH) protocol and the Encapsulating Security Payload (ESP) protocol to provide traffic security. The AH and the ESP protocols are described in RFC 4835, entitled "Cryptographic Algorithm Implementation Requirements for Encapsulating Security Payload (ESP) and Authentication Header (AH)", the contents of which are incorporated herein by reference.

IPsec provides two modes of operation to exchange data across a communication network, namely a tunnel mode and a transport mode. The transport mode only protects the data of the IP packet, whereas the tunnel mode protects the entire IP packet including the IP header. Therefore, the tunnel mode provides identity protection of the hosts, in addition to the data of the IP packets. The IPsec protocol, and the transport and the tunnel mode are described in the RFC 4301, entitled "Security Architecture for the Internet Protocol", the contents of which are incorporated herein by reference.

The security features of the ESP and the AH protocols can only be utilised if there is an existing security association (SA) between the communicating hosts. An SA is a bundle of algorithms, such as secure hash algorithm 1 (SHA1), and parameters, such as security keys, that are used to encrypt and authenticate a given IP packet flow in one direction. Therefore, for bi-directional communication, the IP packet flow is secured by a pair of SAs. An SA is a relationship between two entities that describes how the entities use security services to communicate securely. Without limitation, the agreements between the communicating parties that form an SA include:
 an encryption algorithm;
 an authentication algorithm;
 IPsec mode of operation, i.e. the tunnel mode or the transport mode; and
 a session key and a validity period for the session key.

IPsec uses a Security Parameter Index (SPI), an index to the security association database (SADB), along with the destination address in a packet header, to uniquely identify a security association for a given outgoing IP packet. A similar procedure is performed for an incoming packet, where IPsec gathers decryption and verification keys from the security association database.

As discussed, an IP packet can only be secured and protected by IPsec if there is an existing SA between the communicating hosts. An SA may be created manually, e.g. created by a system administrator, or an SA may be created automatically. IPsec utilises the Internet Key Exchange (IKE) protocols for establishing and configuring SAs between the communicating hosts dynamically. IKE utilises a Diffie-Hellman key exchange to set up a shared session secret, from which cryptographic keys are derived. In addition, IKE uses public key techniques or a pre-shared key to enable the communicating hosts to mutually authenticate each other.

IKE operates in two phases, namely phase 1 and phase 2. The phase 1 establishes a secure authenticated communication channel by using Diffie-Hellman key exchange algorithm to generate a shared secret key to encrypt further IKE communications between the communicating hosts. The phase 1 negotiation results in a single bi-directional Internet Security Association and Key Management Protocol (ISAKMP) SA. The phase 1 may either operate in a main mode, which protects the identity of the communicating hosts, or an aggressive mode, which does not protect the identity of the communicating hosts.

During phase 2, the communicating hosts use the secure channel established in phase 1 to negotiate SAs on behalf of other services like IPsec. In an arrangement, such as where the communicating hosts are establishing SAs for an IPsec communication, the phase 2 is executed at least twice to create two unidirectional SAs, one inbound and one outbound. As will be appreciated, the phase 2 may be executed more than twice depending on the communication arrangements between the communicating hosts.

The phase 1 and the phase 2 of the IKE protocol are described in RFC 2409, entitled "The Internet Key Exchange (IKE)", RFC 4109, entitled "Algorithms for Internet Key Exchange version 1 (IKEv1)", RFC 4306, entitled "Internet Key Exchange (IKEv2) Protocol" and RFC 5282, entitled "Using Authenticated Encryption Algorithms with the Encrypted Payload of the Internet Key Exchange version 2 (IKEv2) Protocol", the contents of which are incorporated herein by reference.

The above described IPsec architecture works efficiently if both the communicating hosts are utilising a standards based implementation of the IPsec VPN, or are both utilising the same proprietary implementation of the IPsec suite of protocols on both the communicating ends. However, IPsec implementations by some vendors are proprietary, which are often not compatible with IPsec implementations of other vendors. Therefore, a user is restricted to using a compatible proprietary IPsec software client to establish a VPN connection with a network using the same proprietary implementation of IPsec.

In an arrangement, such as where a client is establishing a VPN connection from a restricted platform such as the iPhone™, a user's ability to install proprietary software is also limited. Therefore, per such an arrangement, the user may be unable to establish a VPN connection with a network employing a proprietary implementation of the IPsec protocol.

In addition, restrictive platforms, like the iPhone™, may also limit the user's ability to utilise certain features of the IPsec suite of protocols, e.g. the restrictive platform may only permit VPN connections in transport mode. Therefore, per such an arrangement, the identity of the communicating network and the user is exposed.

SUMMARY OF CERTAIN INVENTIVE ASPECTS

In accordance with one aspect of the disclosure, there is provided a global server, a method and a telecommunications system according to the appended claims.

The embodiments described herein are concerned with providing secured access to services provided by a terminating terminal to an authorised initiating terminal. In one embodiment there is provided a server for providing an initiating terminal with authenticated access to services provided by a terminating terminal via a communications network, the server being capable of identifying and authenticating the initiating terminal in respect of services provided by said terminating terminal, said access to services being provided to the initiating terminal via the server on the basis of successful authentication of said initiating terminal by the server.

Thus in embodiments described herein, the initiating terminal is identified and authenticated by the server in relation to services provided by the terminating terminal. Therefore, the server acts as a point of presence for the terminating terminal, and only allows authenticated terminals to access services of the terminating terminal. In some embodiments, the terminating terminal is a private network, and the server acts as point of presence of the private network. In effect, the server acts as a proxy entity that authenticates an initiating terminal in relation to services provided by the private network.

In one embodiment, the server comprises a communications module for receiving and processing a key exchange initiation message from the initiating terminal so as to establish an encrypted communications channel with the terminating terminal, the communications module being responsive to a received key exchange initiation message whereby to perform an encrypted communication establishment process in respect of the received key exchange initiation message, the encrypted communication establishment process comprising:

i. authenticating the initiating terminal; and
ii. in the event that the initiating terminal is successfully authenticated, transmitting keying data corresponding the received key exchange initiation message to the terminating terminal, said keying data being identified on the basis of data associated with the initiating terminal.

Thus, per one embodiment, the server, responsive to receiving a key exchange initiation message, authenticates an initiating terminal associated with the received key exchange initiation message and transmits keying data corresponding to the received key exchange initiation message to a terminating terminal. The keying data enables the initiating terminal and the terminating terminal to establish an encrypted communications channel. Therefore, this embodiment enables a given initiating terminal to establish an encrypted communications channel with a given terminating terminal on the basis of successful authentication of the initiating terminal by the server. In effect, the server, acting as a point of presence for the terminating terminal, enables establishment of the encrypted communications channel between the initiating terminal and the terminating terminal. In this way, the server extends the flexibility of a proxy negotiator that facilitates establishment of an encrypted communications channel between an authenticated initiating terminal and a terminating terminal. Therefore, in event of mismatch between communication protocol capabilities of a given initiating terminal and a given terminating terminal, the server can facilitate establishment of an encrypted communications channel.

In a further embodiment, the server is configured to selectively perform the encrypted communication channel establishment process on the basis of a predetermined condition. The selective execution of the encrypted communication channel establishment process extends the capability of discarding requests from initiating terminals on the basis criterion beyond the authentication. For example, the server can be configured to reject requests from initiating terminals requesting establishment of an encrypted communication channel with a given terminating terminal based on the determination that a given initiating terminal has been scanned for the presence of malicious software.

In a third embodiment, the server is configured to relay packets between a given initiating terminal and a given terminating terminal on a given encrypted communication channel, which has been established on the basis of successful authentication of the given initiating terminal by the server. Therefore, the third embodiment enables the server to act as an encrypted packet relay node on a given encrypted communications channel, whose establishment was facilitated by the server. In one configuration, the third embodiment is extended by providing a selective transmission, or forwarding, of a received encrypted packet to a terminating terminal on the basis of a predetermined communication condition. The selective forwarding of the received encrypted packet extends the flexibility of policy based management of an established encrypted communications channel by the server.

In a fourth embodiment, such as where the server is further configured to generate a second encrypted packet using a communication protocol, different to a communication protocol of a received encrypted packet, the server transmits the generated second encrypted packet to a corresponding initiating terminal or a corresponding terminating terminal. In this way the server removes any inconsistencies in the communication protocols of a given initiating terminal and a given terminating terminal. An example of such an inconsistency can be seen in the scenario where a standard based client on a given initiating terminal is utilised for establishing a secured connection with a non-standard based proprietary implementation of a secured connection establishment process. As will be appreciated, the given initiating terminal in such a scenario is unable to establish a secured connection with the given terminating terminal without the mediation of the server.

In a fifth embodiment, the server is configured to authenticate an initiating terminal on the basis of data derived from a home agent, the home agent being accessible to the communications network, and being arranged to hold data in relation to the initiating terminal. This extends the flexibility of acquiring data in relation to authentication of a given initiating terminal from an entity, other than the given initiating terminal.

In a yet further embodiment, the server is arranged to retransmit a received encrypted packet, whose transmission to a given initiating terminal has failed. The retransmission is performed by the server in response to a predetermined event, such as passage of predetermined amount of time. This reduces a number of failed transmissions of received encrypted packets to a given initiating terminal. It will be appreciated that a temporary loss of connectivity experienced by a given initiating terminal also leads to failed transmission of a given encrypted packet. Further, in this way temporary issues increasing the number failed transmissions of the received encrypted packets is reduced.

According to further aspects of the present invention the server is embodied as a single computing device, or as a distributed system comprising a cluster of computing devices. The server is configured, either as a single device, or a cluster of devices, to perform a method corresponding to the afore-mentioned functionality, and indeed said device or devices are configured with computer code capable of performing the corresponding steps.

Further features and advantages will become apparent from the following description, given by way of example only, which is made with reference to the accompanying drawings.

DETAILED DESCRIPTION

Figure 1:
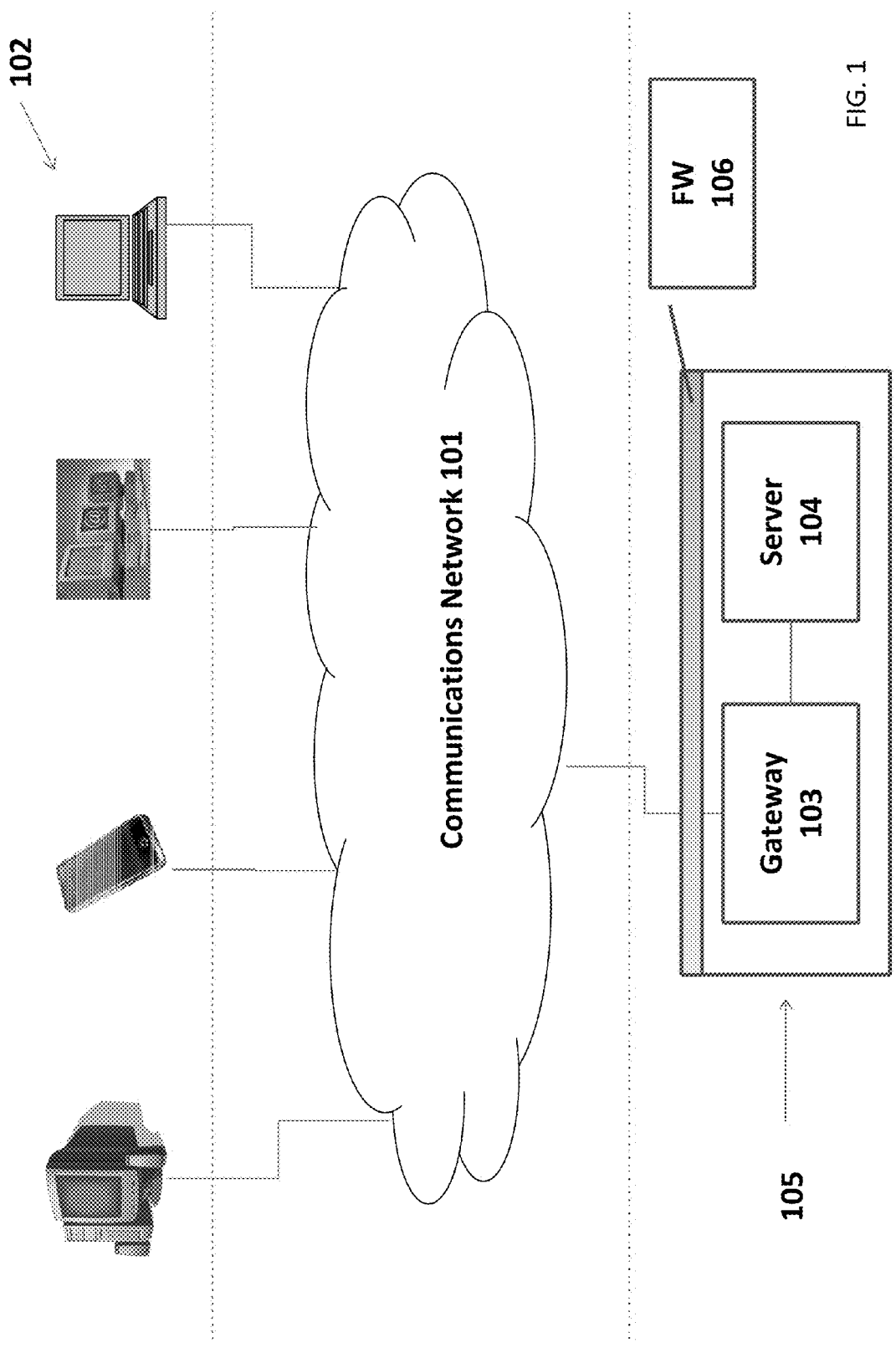
FIG. 1 is a schematic diagram of a network environment.

Embodiments described herein are concerned with establishment of virtual private network (VPN) sessions between an initiating terminal and a private network, on the basis of authentication and communication key negotiation being performed by an entity located external to the private network. More specifically, embodiments are concerned with mediating VPN session establishment between a client end and a server end such that an initiating terminal, or client, is authenticated at a mediating global server entity for a secured access to services provided by a terminating terminal, a private network or a server. The processing involved in establishment of VPN sessions is described in detail below, but first an overview of a network environment is described with reference to FIG. 1, which shows a block diagram illustrating a conventional communications network 101 through which a secured VPN connection is established between an initiating terminal 102, or remote access clients, and a private network 105. Further, a description of how Security Associations (SA) are established using conventional techniques is provided.

The communications network 101 is configured to enable packet communication between the access clients 102 and the private network 105. The access client 102 is a remote device that is capable of using secured services provided by the terminating terminals. Without limitation, the access clients 102 can include a remote desktop computer, a smart phone such as an iPhone™, a network of computers and a laptop. Certain VPN connection types, such as Internet Protocol Security (IPsec), require the access clients 102 to access the services of the private network 105 using client software specifically configured to establish a VPN connection with a given private network 105, whereas others, such as Hypertext Transfer Protocol Secure (HTTPS), do not require specially configured client software.

In an arrangement, such as where the access client 102 comprises a network of computers, a single VPN connection to the private network 105 enables each computer in the network of computers to access the services of the private network 105. The VPN connection could be established by any of the computers in the network of computers or a computer specifically assigned the role of establishing the VPN connection with the private network, such as a gateway.

The private network 105 comprises a firewall 106 to selectively allow traffic into the private network 105 on the basis of predetermined network policies. The private network 105 also comprises a gateway 103 that is arranged to process all incoming VPN packets from the remote access clients 102. The gateway 103 is a point of presence of the private network 105 to the remote access client 102, and processes the incoming packets from remote access clients, including the VPN connection initiation requests and the key exchange messages. In addition, the private network 105 comprises a Server 104 that is arranged to provide data or services to the remote access clients. The operation of the firewall 106, the server 104 and the gateway 103 can be performed by separate network entities or combined into a single network entity.

A VPN connection initiation request can either be sent from the private network 105 end or the remote access client 102 end. As per the conventional systems, a remote access client 102 initiated VPN connection establishment or an encrypted communication establishment process begins when a VPN connection request is sent from the remote access client 102. The request is routed to the point of presence, such as the gateway 103, of the private network, which then processes the incoming VPN connection establishment request.

In one arrangement, such as where the incoming VPN connection establishment request is an IPsec connection establishment request, the gateway 103 establishes whether there is an existing SA between the remote access client 102 and the private network 105. As described above, IPsec utilises the Internet Key Exchange (IKE) protocols for establishing and configuring SAs between the communicating hosts dynamically.

In the event that there is no existing SA between the remote access client 102 and the private network 105, the point of presence of the private network 105, such as the gateway 103, and the remote access client 102 initiate an IKE communication exchange to establish an SA between the communicating hosts, the remote access client 102 and the private network 105.

In the arrangement in which the IKE communication exchange is initiated by the remote access client 102 and the communicating hosts utilise IKEv 1 to setup an initial SA, the remote access client 102 transmits a key exchange initiation message to the private network 105. The key exchange initiation message comprises a header and a proposal for establishing an SA with the private network 105. The point of presence of the private network 105, such as the gateway 103, responds to the key exchange initiation message by sending a message indicating a choice of attributes based on which the SA should be established. The headers in the key exchange initiation message and the key exchange initiation response comprise an initiator cookie (cookie-I) and a responder cookie (cookie-R). The initiator and the responder cookies are commonly referred to as the Internet Security Association and Key Management Protocol (ISAKMP) anti-clogging cookies.

The remote access client 102 then responds with public values of an initiator key ($KE_i$) and a random number (Nonce$_i$). Responsive to receiving the $KE_i$ and Nonce$_i$, the gateway 103 responds with public values of a responder key ($KE_r$) and another random number (Nonce$_r$). The communicating hosts then compute a set of secret keys (SKEYID, SKEYID_a, SKEYID_d and SKEYID_e), which are used for securing any further communication between the communicating hosts. The secret key SKEYID_a is used for authenticating IKE phase 2 messages, SKEYID_d is used for deriving other keys in the IKE phases 1 and 2, and SKEYID_e is used for encrypting any further messages in IKE phase 1 and all IKE phase 2 messages. The shared key SKEYID is used for determining SKEYID_a, SKEYID_d and SKEYID_e. The computation of the key SKEYID is dependent on the authentication protocol. Without limitation the authentication protocol could be the pre-shared key, the public key signature, the public key encryption or the revised public key encryption.

In the arrangement in which the authentication protocol is the pre-shared key protocol, the secret keys, the keying data or the keying material, computed by the communicating hosts, the gateway 103 and the remote access client 102, is:

SKEYID=prf(preshared-key|Nonce$_i$|Nonce$_r$)

SKEYID_d=prf(SKEYID,$KE_i KE_r$|cookie-$I$|cookie-$R$|0)

SKEYID_a=prf(SKEYID, SKEYID_d|$KE_i KE_r$|cookie-$I$|cookie-$R$|1)

SKEYID_e=prf(SKEYID, SKEYID_a|$KE_i KE_r$|cookie-$I$|cookie-$R$|2)

where the function prf is a pseudorandom function and $KE_i KE_r$ is the shared secret.

Responsive to the generation of the shared keys, the remote access client 102 transmits its identification and authentication data, which is encrypted with the secret key SKEYID_e. After successfully authenticating the remote access client 102, the gateway 103 transmits the private network's 105 identification and authentication data encrypted with the secret key SKEYID_e. The successful authentication of the private network 105 marks the end of phase 1 exchange, and the communicating hosts can then begin the phase 2 exchange to setup the unidirectional IPsec SAs.

The phase 2, or quick mode, message exchange can be initiated by either of the communicating hosts. In the event that the phase 2 message exchange is initiated by the remote access client 102, the remote access client 102 transmits a first message comprising a header, a first hash (Hash$_1$), an SA proposal, an initiator random number (Nonce$_{2i}$), an initiator key ($KE_{2i}$) and identification data ($ID_{ui}$, $ID_{ur}$). The identification data and the initiator key in the first message is optional; the identification data is used in the quick mode by an initiator to indicate a quick mode negotiation is a proxy negotiation on behalf of a communicating end, $ID_{ui}$. In the event that the identification data and the initiator key are included in the first message, then a responding host must send corresponding responder values, i.e. $ID_{ui}$, $ID_{ur}$ and $KE_{2r}$, to continue the negotiation. The initiating hosts utilises the secret shared key SKEYID_e, generated during the phase 1 message exchange to encrypt all the contents of the message, except the header.

The gateway 103, being the actual point of presence of the private network 105, responds by sending a second message to the remote access client 102 comprising a second header, a second hash (Hash$_2$), an SA choice, a responder random number (Nonce$_{2r}$), a responder key ($KE_{2r}$) and identification data ($ID_{ui}$, $ID_{ur}$). As discussed above, the contents of the message, except the second header, are encrypted with the secret shared key SKEYID_e. In response to receiving the second message, the remote access client 102 transmits a third message comprising a third header and a third hard (Hash$_3$) encrypted with the secret shared key SKEYID_e, which marks the end of phase 2 exchange.

The communicating hosts generate the first, second and third hashes as follows:

Hash$_1$=prf(SKEYID_$a$,message-$ID$|$SA$|Nonce$_{2i}$| [$KE_{2i}$]|[$ID_{ui}$|$ID_{ur}$])

Hash$_2$=prf(SKEYID_$a$,message-$ID$|Nonce$_{2i}$|$SA$|Nonce$_{2r}$|[$KE_{2r}$]|[$ID_{ui}$|$ID_{ur}$])

Hash$_3$=prf(SKEYID_$a$,message-$ID$|Nonce$_{2i}$|Nonce$_{2r}$)

The identification data ([$ID_{ui}$|$ID_{ur}$]) and the key data ($KE_{2i}$, $KE_{2r}$) is only utilised in the computation of hashes if the identification data and the key data is present in the first and the second messages. The first, second and the third hashes are utilised by the communicating hosts to authenticate the corresponding first, second and the third messages.

In an arrangement, such as where the communicating hosts engage in a phase 1 and phase 2 message exchanges to establish a secured IPsec VPN communication channel, the communicating hosts compute a communication key, or KEYMAT, for each of the unidirectional SAs. The KEYMAT is computed as follows:

KEYMAT=prf(SKEYID_$d$,[$KE_{2i} KE_{2r}$] |protocol|$SPI$|Nonce$_{2i}$|Nonce$_{2r}$)

where $KE_{2i} KE_{2r}$ is the shared secret.

The keys $KE_{2i}$ and $KE_{2r}$ are utilised in the computation of hashes, if the keys are transmitted during the phase 2 message exchange. The protocol in the KEYMAT is the security protocol chosen by the responding communicating host from the list of proposals offered by the initiating communicating host. The SPI is the security parameter index. Since each initiator and the responder choose its own SPI for a security protocol, the SPI makes a given KEYMAT unidirectional.

A VPN client software, which is installed on a user terminal, facilitates establishment of a VPN connection between the user terminal and a given private network. Some platforms, such as Windows™ and iPhone™, have a built-in non-configured VPN client software, which can be configured with configuration attributes of a given private network. A user can also acquire a third-party non-configured VPN client for a given platform, if available, and configure the third-party non-configured VPN client with connection attributes of a given private network. A given private network may also provide a VPN client to a user that is pre-configured with configuration attributes of the given private network. Although, some platforms, such as iPhone™, do not permit a user to install a third-party non-configured VPN client or a pre-configured VPN client, thus leaving the user with no option but to use the built-in VPN client.

VPN implementations require a given VPN client software to be specifically configured per the configuration attributes of a given private network to be able to establish a VPN connection with the given private network.

Figure 2:
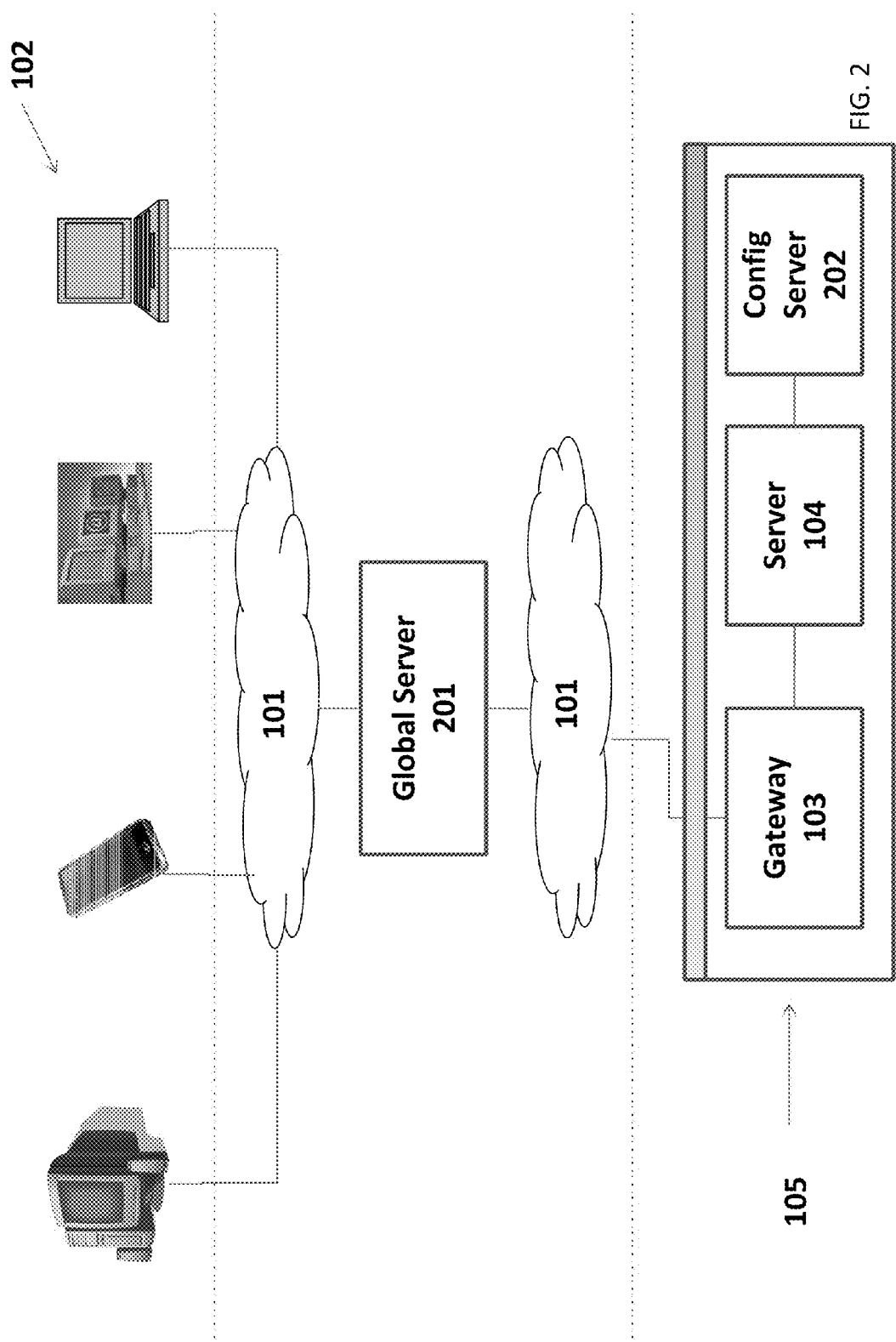
FIG. 2 is a schematic diagram of another network environment.

Turning to FIG. 2, in addition to the conventional components described above, the communications network 101 when configured according to the embodiments of the invention, includes a server, hereinafter referred to as a global server 201, which acts as a point of presence for the private network 105 to the remote access client 102. The global server 201 engages in the IKE phase 1 message exchange with the remote access client 102 on behalf of the private network 105, and authenticates the remote access client 102. In the event that the remote access client 102 is successfully authenticated, the global server 201 transfers the request to the private network 105, which then establishes the parameters for secured communication with the remote access client 105. In effect, the global server 201 authenticates incoming communication requests on behalf of the private network 105 and the private network 105 establishes the parameters for secured communication for every authenticated request. Therefore, the global server 201 facilitates establishment of a secured communication channel, or an encrypted communication path, between the remote access client 102 and the private network 105.

In an arrangement, such as where a user can acquire a preconfigured VPN client, the user can install the client software on their remote access client 102 to be able to communicate with private network 105 via the global server 201. The VPN client software and a set of configuration attributes could also be made available separately to the user. Without limitation the preconfigured VPN client software, the non-configured VPN client software and the configuration settings for the VPN client software can be made available to the user via the Internet, on a portable data carrying medium, such as a compact disk, and via a specialized application store, such as the Apple™ Appstore.

In the arrangement in which the configuration settings are made available to a user via a configuration server 202 within the private network 105, the user acquires the configuration settings utilising a clientless VPN communication session, such as HTTPS (HTTP over SSL/TLS). The communication session between the remote access client 102 and the configuration server 202 can be made directly, without going through the global server 201.

In an alternative arrangement, such as where the user is not aware of the location of the configuration server 202, the user can establish a VPN communication session with the configuration server 202 via the global server 201. The global server 201 acts as a traffic redirector in this arrangement, and is not involved in the establishment of communication keys.

The remote access client 102 can be configured to transmit the VPN connection establishment requests to the global server 201 or to the private network 105. In an arrangement, such as where the remote access client 102 is configured to communicate directly with the private network 105, a routing device is configured to route the VPN connection establishment requests from the remote access client 102 to the global server 201.

Although the IPsec protocol suites provide a broad range of features, many vendors have developed their own proprietary implementation of the IPsec suite of protocols. The proprietary implementations enable the vendors to offer highly customised solutions, and ways to extend the IPsec protocol suite, e.g. the IPsec protocol suite limits the authentication and the IKE phase 2 operations to be performed by the same entity. This may not be desirable in certain arrangements, such as where a gateway not in the private network 105 authenticates a remote access client 102 and a separate device, namely data server 104 within the private network 105 establishes a VPN data communication session with the remote access client 102.

In addition, the lack of interoperability between the proprietary platforms poses serious problems, e.g. an access client 102 has to install a range of proprietary software clients to communicate with a range of private networks. In addition, restrictive platforms, such as an iPhone™, restrict the installation of software clients on the platform. Therefore, a combination of the restrictive platform and the proprietary server software leads to a given access client 102 being unable to communicate with the private network 105.

The global server 201 is configured to overcome such interoperability issues with VPN networks. Specifically the global server 201 is arranged to authorise a given remote access client 102 to establish a secure VPN communication session with the private network 105, and then facilitate establishment of a secure VPN communication session between the remote access client 102 and the private network 105.

As discussed above, the phase 2 message exchange of the IKE protocol could be undertaken by a proxy entity acting on behalf of a communicating entity. However, no such provisions are available to a communicating host during the phase 1 message exchange of the IKE protocol. Embodiments described herein provide a proxy negotiating entity during the phase 1 message exchange.

Figure 3:
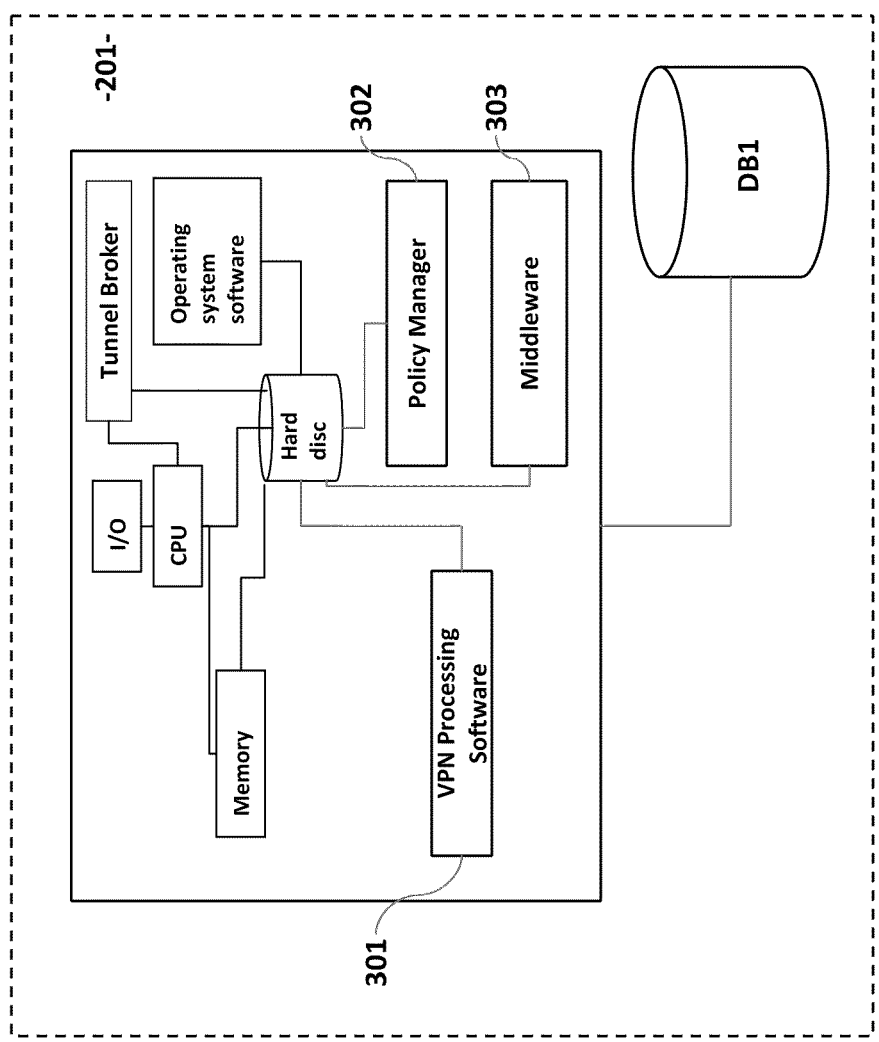
FIG. 3 is a block diagram showing components of a global server of FIG. 2.

Turning to FIG. 3, an arrangement of the global server 201 is described in more detail. The global server 201 comprises a combination of processing components including standard operating system components, memory, processor, input/output interfaces, and permanent storage. In addition the global server 201 comprises conventional VPN setup components, such as a tunnel broker component, which provide VPN setup processing capabilities to the global server 201. The tunnel broker component, responsive to receiving a VPN connection initiation message, brokers a set of attributes based on which the VPN communication session is established. In this way the tunnel broker component helps set up a dynamic connection agreement between the communicating hosts 102, 105. Without limitation, the agreements between the communicating hosts 102, 105 include the type of VPN communication session, such as IPsec, and a protocol conversion agreement, such as IPv6 protocol packets tunnelled inside IPv4 protocol packets. In addition to the IPsec protocol suite, the tunnel broker component is also arranged to communicate using the Tunnel Setup Protocol (TSP) or the Tunnel Information Control (TIC) protocol.

In addition, the global server 201 comprises VPN processing software component 301, which is arranged to establish an initial SA between the remote access client 102 and the private network 105.

In an arrangement, such as where the communicating hosts 102, 105 utilise the shared keys established during the establishment of the initial SA for any further communication, the communicating hosts 102, 105 encrypt the data to be communicated using the initial SA keys and transmit them to the receiving communicating host via the global server 201. In such an arrangement, the secured data transmitted between the communicating hosts 102, 105 can be accessed by the global server 201, and the data is at risk if the global server 201 is compromised.

In an alternative arrangement, such as where the communicating hosts 102, 105 compute further keys for encrypting data after the establishment of the initial SA, the communication between the communicating hosts 102, 105 is not accessible to the global server 201. In such arrangements, the global server 201 merely relays any communication to a corresponding recipient.

The VPN software processing component 301 provides an initiating terminal, in this embodiment the remote access client 102, with authenticated access to services provided by a terminating terminal, or the gateway 103, via the communications network 101. The global server 201 is capable of identifying and authenticating the initiating terminal in respect of services provided by the terminating terminal or the private network 105 to which the terminating terminal belongs. In the event that the initiating terminal 102 is successfully authenticated by the global server 201, the access to services provided by the terminating terminal 105 is provided to the initiating terminal 102.

The VPN software processing component 301 comprises a communications module for receiving and processing a key exchange initiation message received from the initiating terminal 102. The key exchange initiation message is sent by the initiating terminal 102 to establish an encrypted communications channel with the terminating terminal. In response to receiving the key exchange initiation message, the communications module performs an encrypted communication establishment process in respect of the received key exchange initiation message. The encrypted communication establishment process comprises authenticating the initiating terminal 102. In the event that the initiating terminal 102 is successfully authenticated, the VPN software processing component 301 transmits keying data corresponding to the received key exchange initiation message to the terminating terminal. The keying data, the key data or the keying material, is identified by the VPN software processing component 301 on the basis of data associated with the initiating terminal.

Figure 4:
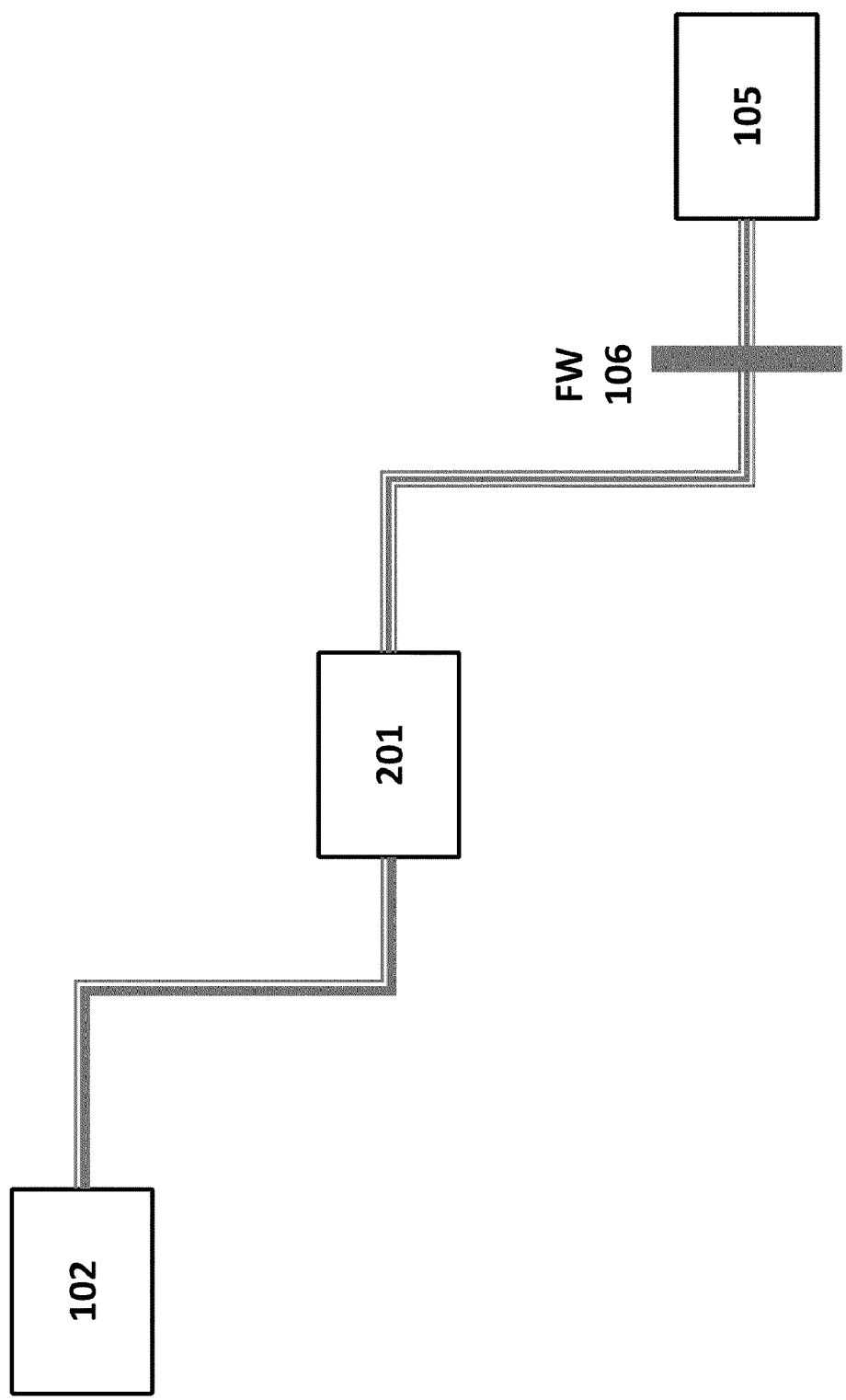
FIG. 4 is a block diagram showing an established encrypted communications channel through a communications network.

FIG. 4 shows an arrangement where a secured VPN connection is established between the remote access client 102 and the private network 105. As can be seen, any communication messages sent to the private network 105 is screened by the firewall 106, and if the communication messages satisfy a set predetermined condition, the firewall 106 transmits the communication to the private network 105.

In the event that an initial SA has been successfully negotiated between the remote access client 102 and the global server 201, the private network 105 utilises the initial SA to negotiate further SAs with the remote access client 102. During the negotiation of the initial SA, the global server 201 acts as a point of presence of the private network 105 to the remote access client 102. In effect, the global server 201 acts as a proxy negotiator for the phase 1 IKE message exchange for the private network 105.

Figure 5:
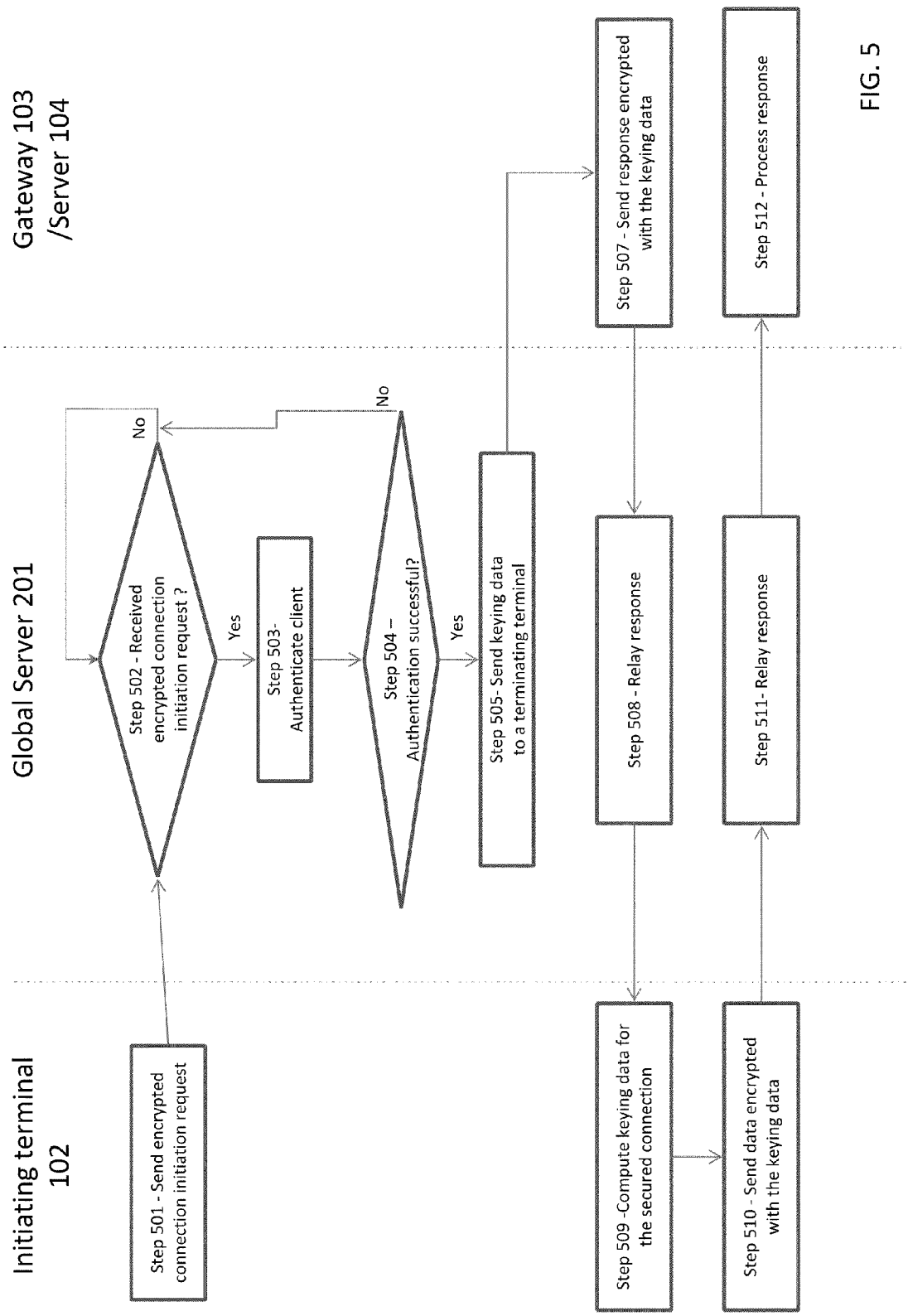
FIG. 5 is a schematic flow diagram of processes carried out by the components shown in FIG. 2.

FIG. 5 illustrates the processes carried out by entities involved in the processing of an encrypted communications channel initiation request, or a key exchange initiation request. The encrypted communications channel establishment process begins when an initiating terminal, in this embodiment remote access client 102, transmits an encrypted communications channel initiation request (step 501). As will be understood by a person skilled in the art, the encrypted communications channel initiation request could be transmitted by the remote access client 102 to either the actual point of presence of the private network 105 or the global server 201. The destination of the encrypted communications channel initiation request is determined by the remote access client 102 on the basis of the configuration settings of a connection module on the remote access client 102, the connection module participating in the establishment of a secured access to the services provided by the private network 105.

In the arrangement in which the encrypted communications channel initiation request is transmitted to the actual point of presence of the private network 105, a message redirection means such as a router is employed by the communications network 101 to redirect the encrypted communications channel initiation request to the global server 201.

In response to receiving the encrypted communications channel initiation request, the VPN processing software component 301 initiates encrypted communications establishment process to be able to authenticate the remote access client 102 (step 502).

In the arrangement in which the encrypted communications channel initiation request comprises authentication data in relation to the remote access client 102, the VPN processing software component 301 utilises the authentication data to authenticate the remote access client 102.

In a further arrangement, such as where the encrypted communications channel initiation request does not comprise authentication data in relation to the remote access client 102, the VPN processing software component 301 initiates a message exchange with the remote access client 102 in order acquire the authentication data in relation to the remote access client 102.

In the event that the VPN processing software component 301 is able to acquire the authentication data in relation to the remote access client 102, the VPN processing software component 301 at step 503 verifies the authentication data in order to authenticate the remote access client 102 associated with the encrypted communications channel initiation request. In the event that the authentication is not successful, the VPN processing software component 301 at step 504 declines the encrypted communications channel initiation request. The VPN processing software component 301 may also generate an error or an information message explaining the reasons for declining the encrypted communications channel initiation request, and send the generated error or the information message to the remote access client 102.

The VPN processing software component 301 can maintain a log in relation to the outcome of processing of each of the incoming encrypted communications channel initiation requests: the VPN processing software component 301 adds information in relation the remote access client 102 associated with the declined encrypted communications channel initiation message. The VPN processing software component 301 is arranged to generate a blacklist of the remote access clients 102 by monitoring the log information identifying the previous encrypted communications channel initiation requests of a given remote access client 102. This then enables the VPN processing software component 301 to decline incoming encrypted communications channel initiation requests from a given remote access client 102 on the basis of the log information identifying a previous declined encrypted communications channel initiation request.

In a yet further arrangement, such as where the VPN processing software component 301 is arranged to generate keying data in order to authenticate a given remote access client 102, the VPN processing software component 301 generates the keying data on the basis of the encrypted communications channel initiation request and any further messages forming part of the message exchange between the VPN processing software component 301 and the remote access client 102. In the event that the VPN processing software component 301 is able to successfully authenticate a given remote access client 102 associated with a given encrypted communications channel initiation message at step 504, the VPN processing software component 301 transmits the generated keying data to an actual point of presence of the private network 105, such as the gateway 103.

In arrangements where the VPN processing software component 301 does not generate keying data in relation to an encrypted communications channel initiation request message, the VPN software processing component 301 authenticates the remote access client 102 on the basis of unencrypted authentication information.

In the event that the authentication information is encrypted, the VPN software processing component 301 transmits the remote access client's encrypted authentication data to an entity (not shown) responsible for generating the keying data in relation to encrypted communications channel initiation requests received at the global server 201. The entity may also authenticate the remote access client 102. Alternatively the VPN software processing component 301, in conjunction with the key generation entity, authenticates the remote access client 102.

In the event that the VPN software processing component 301 successfully authenticates the remote access client at step 504, the VPN software processing component 301 is configured to facilitate establishment of a secured communication channel between the remote access client 102 and the private network 105.

In arrangements where the global server 201 is arranged to negotiate the keying data on behalf of the private network 105, the remote access client 102 and the private network 105 can communicate directly with each other using the keying data negotiated by the global server 201 to secure the transmitted communication messages without any involvement of the global server 201.

In a yet further arrangement, such as where the global server 201 acts as a proxy negotiator and as a relay node, a secured communication channel is established between the remote access client 102 and the private network 105 via the global server 201. A communication message transmitted via the established secured communication channel by the private network 105 to the remote access client 102 at step 507 is transmitted to the global server, which then further relays the communication message to the remote access client 102. The communication message encrypted at step 507 is encrypted with the keying data provided by the VPN software processing component 301. In response to receiving the encrypted communication message, the remote access client 102 computes keying data for the encrypted communications channel at step 509. It will be understood by a person skilled in the art that the remote access client 102 may generate the keying data prior to receiving the communication message.

A further communication message exchanged between the private network 105 and the remote access client 102 is encrypted with the keying data after the step 509, thereby establishing an encrypted communication channel, or an encrypted communications channel, between the private network 105 and the remote access client 102, wherein the keying data acts as a shared secret key for the established encrypted communications channel. It will be understood by a person skilled in the art that the keying data may also be utilised for securing communication between the remote access client 102 and the global server 201, and the global server 201 and the private network 105.

It will also be understood by a person skilled in the art that the private network 105 and the remote access client 102 may negotiate further keys for securing communication data transmitted between the remote access client 102 and the private network 105. A further communication message exchanged between the private network 105 and the remote access client 102 to negotiate any such further keys is encrypted with the keying data. Since the further keys are negotiated directly between the communicating hosts, i.e. the remote access client 102 and the private network 105, with the global server 201 merely acting as a relay node, the further keys are not accessible to the global server 201. Therefore, a further communication message secured with a further key is relayed by the global server 201 without having any access to the contents of the further communication message. Thus, in the event that the global server 201 is compromised the contents of any communication messages secured with the further key are not compromised.

Figure 6:
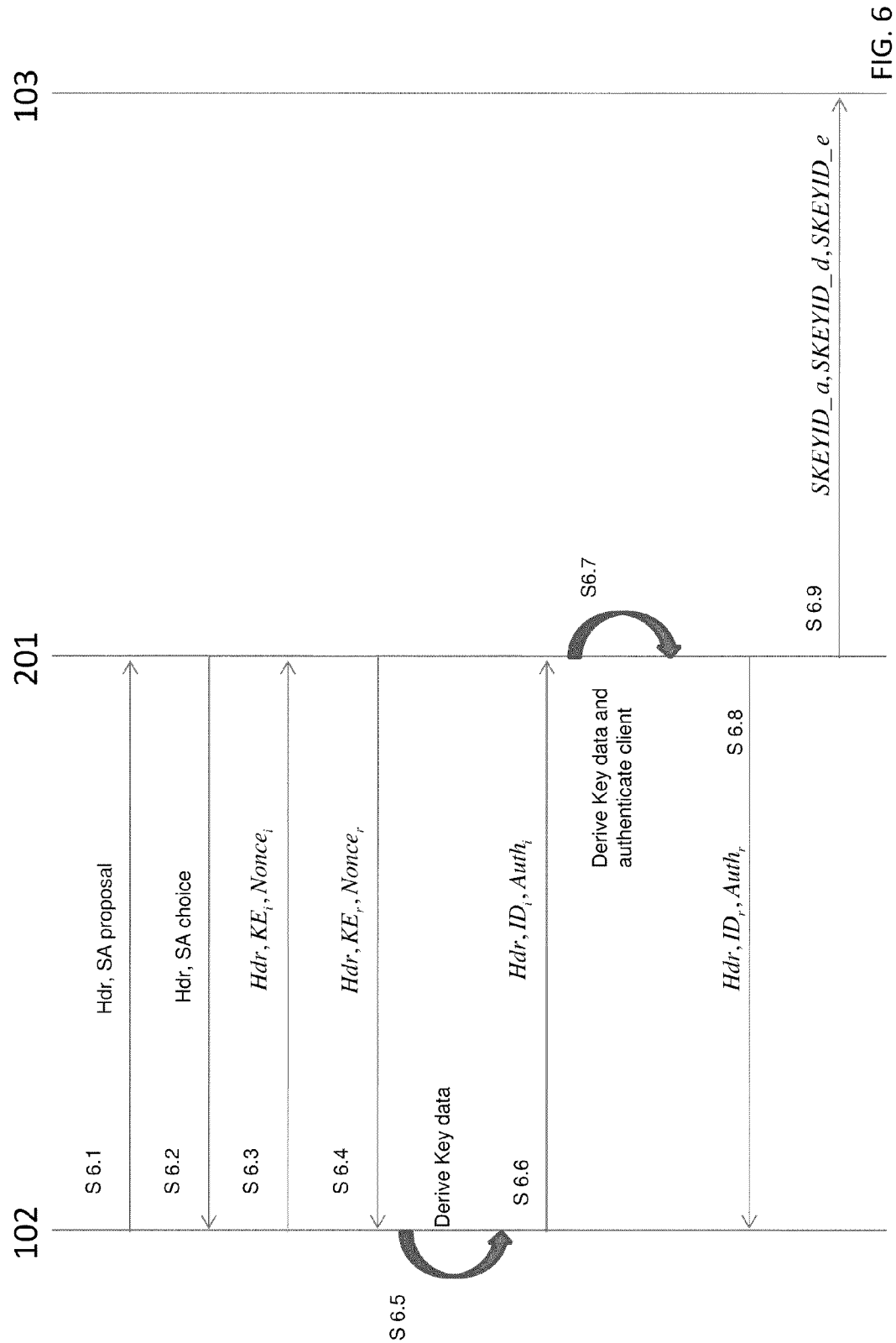
FIG. 6 is a timing diagram showing steps performed by the components shown in FIG. 2 when operating in accordance with Internet Key Exchange (IKE) version 1 (v1)

Turning to FIG. 6, a negotiation of the keying data per the IKE version 1 is described. The keying data is negotiated as part of the establishment of the initial SA negotiation, per the phase 1 of IKE. The phase 1 IKE version 1 message exchange begins with a first message from the remote access client 102 to the point of presence of the private network 105. Since the global server 201 acts as the point of presence of the private network 105, the first message is routed to the global server 201. At step 6.1, a first message comprising a header and a list of proposals for forming an initial SA is transmitted by the remote access client 102 to the global server 201. In response to receiving the first message, the VPN software processing component 301 transmits a second message to the remote access client 102 comprising a header and a choice from the list of SA proposals suggested by the remote access client 102 in the first message.

The remote access client 102 then generates an initiator key ($KE_i$) and an initiator random number ($Nonce_i$). At step 6.3, the remote access client 102 transmits a message comprising a header, the initiator key and the initiator random number to the global server 201. In response to receiving the initiator key and the initiator random number, the global server 201 generates a responder key ($KE_r$) and a responder random number ($Nonce_r$). At step 6.4, the global server transmits a message comprising a header, the responder key and the responder random number. It will be understood by a person skilled in the art that the global server 201 can generate the responder key and the responder random number at any stage between steps 6.2 and 6.4.

In the event that the keys and the random numbers are successfully exchanged between the remote access client 102 and the global server 201, the global server 201 and the remote access client 102 generate a set of keying material, key data or keying data, which are used for securing further communication. The computing algorithms used for generating the key data depends on the authentication algorithm that was agreed by the remote access client 102 and the global server 201 for the purposes of authenticating each other. The key data comprises a set of three shared secret keys. The first key (SKEYID_a) is used for authenticating the messages exchanged during the phase 2 of the key exchange protocol. The second key (SKEYID_d) is used for deriving further secret keys in the phase 1 message exchange and a set of secret keys generated during the phase 2 message exchange. The third key (SKEYID_e) is used for encrypting any further messages during the phase 1 message exchange and the messages transmitted during the phase 2 message exchange.

In the arrangement in which the authentication protocol is the pre-shared key protocol, the key data is generated as follows:

$$SKEYID = prf(preshared\text{-}key|Nonce_i|Nonce_r)$$

$$SKEYID\_d = prf(SKEYID, KE_iKE_r|cookie\text{-}I|cookie\text{-}R|0)$$

$$SKEYID\_a = prf(SKEYID, SKEYID\_d|KE_iKE_r|cookie\text{-}I|cookie\text{-}R|1)$$

$$SKEYID\_e = prf(SKEYID, SKEYID_a|KE_iKE_r|cookie\text{-}I|cookie\text{-}R|2)$$

where $KE_iKE_r$ is the shared secret.

After successfully generating the keys, the remote access client 102, at step 6.6, transmits a message to the global server 201 comprising its identification ($ID_i$) and authentication data ($Auth_i$) encrypted with the key SKEYID_e. The message further comprises an unencrypted header. In response to receiving the message, the global server 201 authenticates the remote access client 102 based on the authentication data (step 6.7).

In the event that the client is successfully verified, the global server 201 encrypts the private network's 105 identification ($ID_r$) and authentication data ($Auth_r$) with the key SKEYID_e, and transmits the encrypted identification data and the encrypted authentication data to the remote access client 102 (step 6.8). The remote access client 102 then authenticates the private network 105 by verifying the encrypted authentication data. The successful authentication of the private network 105 marks the end of the phase 1 message exchange.

The global server 201 then transmits the key data to a VPN processing entity associated with the private network 105 (step 6.9). In the arrangement in which the actual point of presence of the private network 105 is the gateway 103, the global server 201 transmits the key data to the gateway 103. It will be understood by a person skilled in the art that any entity in the private network, including the gateway 103, the server 104 or the configuration server 202, could act as the actual point of presence of the private network. In addition to the keying data, the global server 201 may also transmit data identifying remote access client 102 network address (e.g. a client source IP address and a client destination IP address) and data identifying the chosen SA proposals.

The key data generated during the phase 1 message exchange enables the private network 105 to negotiate further SAs with the remote access client 102. Therefore, the global server 201 acts as a proxy point of presence for the private network 105, and the global server 201 negotiates an initial SA on behalf of the private network 105. In effect, a proxy entity negotiates on behalf of another entity for the key exchange protocol. Since the private network 105 only receives access requests from remote access clients 102 who have been successfully authenticated by the global server 201, the private network's 105 resources are not expended on processing bogus and invalid access requests. Therefore, processing resources of the private network 105, which would otherwise be expended on processing bogus and invalid access requests, are saved. In addition, the global server 201 guards the location details of the private network 105 by revealing the identity and location of the private network 105 only to genuine remote access clients 102.

Figure 7:
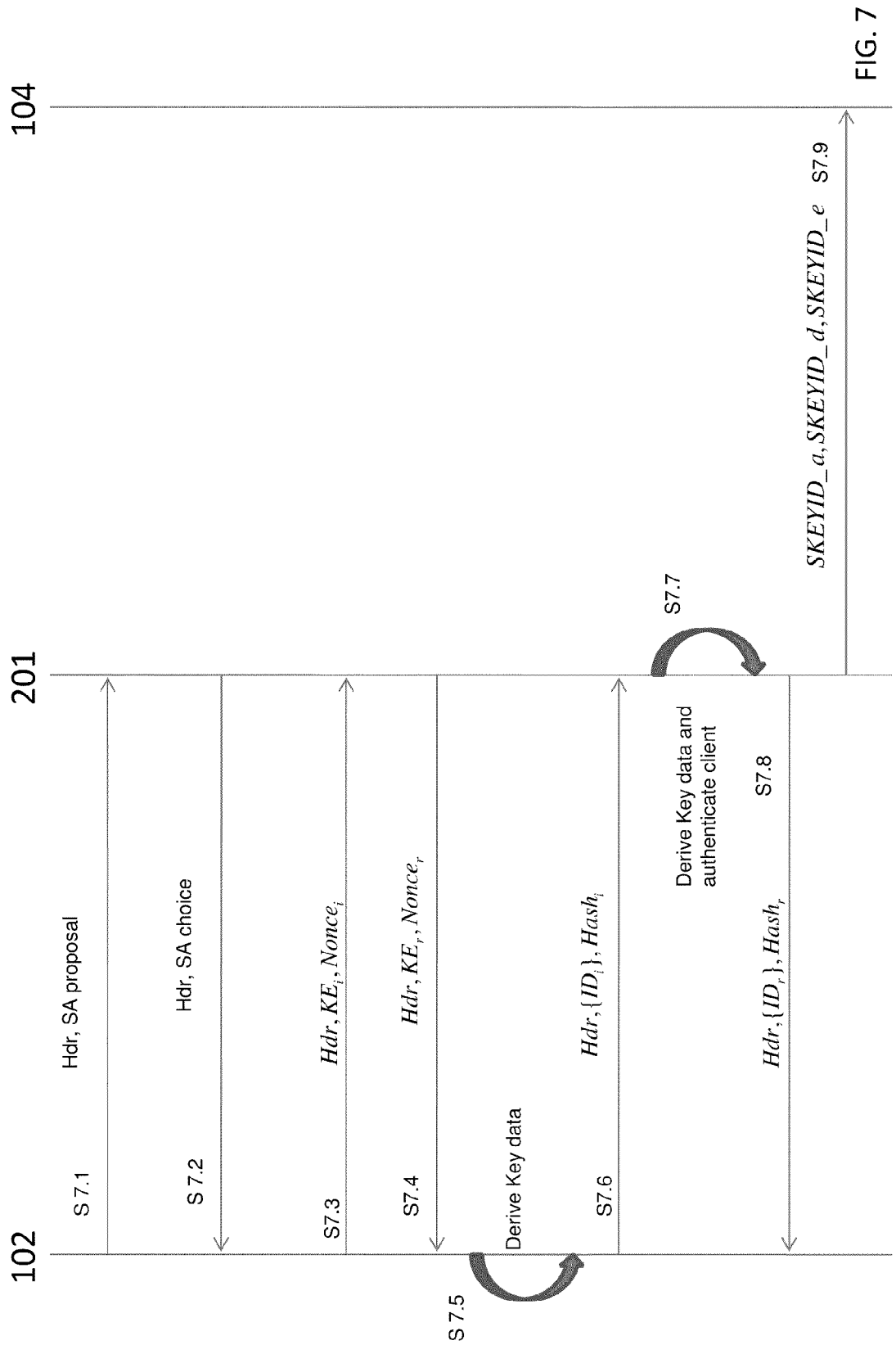
FIG. 7 is a timing diagram showing steps performed by the components shown in FIG. 2 when operating in accordance with IKEv1 pre-shared secret based client authentication.

Turning to FIG. 7, a negotiation of an SA per pre-shared secret based authentication, which is one of the client authentication modes in IKEv1 is described in more detail. The messages at steps 7.1 and 7.2 carry out a SA parameter negotiation. The remote access client 102 initiates the message exchange by transmitting a list of proposals for establishing an SA to the VPN software processing component 301 of the global server 201. The VPN software processing component 301 communicates a choice from the list of proposals to the remote access client 102. In the event that the VPN software processing component 301 does not support any of the proposals proposed by the remote access client 102, the VPN software processing component 301 rejects the entire list of proposals and transmits an error message to the remote access client 102 (not shown).

In the arrangement in which the mode of authentication is the pre-shared key, the VPN software processing component 301 selects a proposal comprising the pre-shared key based authentication from the list of proposals. The remote access client 102 and the global server 201 then exchange an initiator key ($KE_i$), an initiator random number ($Nonce_i$), a responder key ($KE_r$) and a responder random number ($Nonce_r$) at steps 7.3 and 7.4. In response to receiving the responder key ($KE_r$) and the responder random number ($Nonce_r$), the remote access client 102 generates key data for securing further communication messages.

As discussed above, the key data per the pre-shared secret authentication mode in IKE v1 is generated as follows:

$$SKEYID = prf(preshared\text{-}key|Nonce_i|Nonce_r)$$

$$SKEYID\_d = prf(SKEYID, KE_iKE_r|cookie\text{-}I|cookie\text{-}R|0)$$

$$SKEYID\_a = prf(SKEYID, SKEYID\_d|KE_iKE_r|cookie\text{-}I|cookie\text{-}R|1)$$

$$SKEYID\_e = prf(SKEYID, SKEYID\_a|KE_iKE_r|cookie\text{-}I|cookie\text{-}R|2)$$

where $KE_iKE_r$ is the shared secret.

In pre-shared secret based authentication, the communicating hosts 102, 105 authenticate each other on the basis of an initiator hash ($Hash_i$) and a responder hash ($Hash_r$), which are computed as follows:

$$Hash_i = prf(SKEYID, KE_i|KE_r|cookie\text{-}I|cookie\text{-}R|SA|ID_i)$$

$$Hash_r = prf(SKEYID, KE_r|KE_i|cookie\text{-}R|cookie\text{-}I|SA|ID_r)$$

where $KE_i$ and $KE_r$ are public values of the initiator and responder keys.

The SA used for computing the initiator hash and the responder hash is a SA payload sent by the remote access client 102 at step 7.1.

In response to successfully deriving the key data and the initiator hash, the remote access client 102 at step 7.6 transmits a message comprising an unencrypted header, and the initiator ID and the initiator hash encrypted with the key SKEYID_e. In response to receiving the encrypted initiator ID and the encrypted initiator hash, the VPN software processing component 301 computes the key data. It will be understood by a person skilled in the art that the VPN software processing component 301 can generate key data at any stage between steps 7.4 and 7.7.

The VPN software processing component 301 authenticates the remote access client 102 by computing the initiator hash itself, and comparing the generated initiator hash with the received initiator hash. In the event that the computed initiator hash and the received initiator hash are not equal, the remote access client 102 is determined to have failed the authentication. The VPN software processing component 301 then rejects the request for an encrypted communications channel, and transmits an error message to the remote access client 102.

In the event that the authentication is successful, i.e. the computed initiator hash is equal to the received initiator hash, the VPN software processing component 301 computes the responder hash (Hash$_r$) and transmits the responder hash (Hash$_r$) to the remote access client 102, along with the identification details (ID$_r$) of the private network 105 (step 7.8).

In the event that the VPN software processing component 301 is not aware of the identification details of the private network 105, the VPN software processing component 301 acquires the identification details (ID$_r$) of the private network 105 from the actual point of presence of the private network 105, such as the server 104 or the gateway 103.

In response to successful transmission of the identification details (ID$_r$) and the responder hash (Hash$_r$) to the remote access client 102, the VPN software processing component 301 transmits the key data to the actual point of presence of the private network 105 (step 7.9).

The remote access client 102 authenticates the private network 105 after receiving the responder hash, and in the event that the authentication is successful, an encrypted communication session is established between the remote access client 102 and the private network 105.

The VPN software processing component 301 may further transmit the initiator key, the responder key, the initiator cookie, the responder cookie, the initiator ID, a client source IP address, a client destination IP address, data identifying the chosen SA proposals and the SA payload to the actual point of presence of the private network 105, such as the server 104 or the gateway 103, in addition to the key data.

Figure 8:
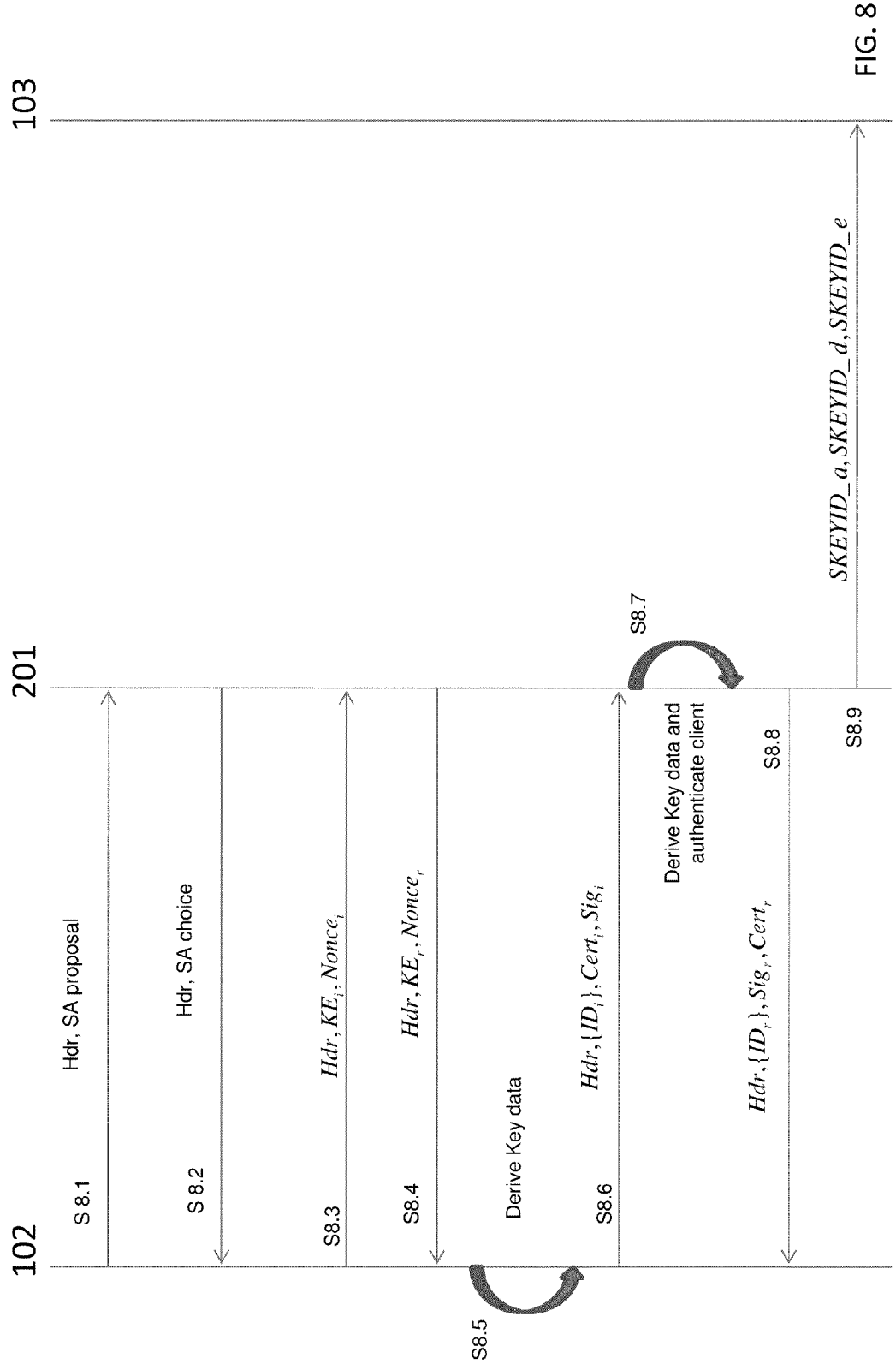
FIG. 8 is a timing diagram showing steps performed by the components shown in FIG. 2 when operating in accordance with IKEv1 public key signature based client authentication.

FIG. 8 describes the establishment of an SA per digital signature based authentication in IKE v1 and thus differs from the embodiments in FIGS. 6 and 7 in that this embodiment describes a further alternative mode of authenticating a client. As in the pre-shared secret based authentication, the SA establishment process begins by carrying out an SA parameter negotiation at steps 8.1 and 8.2. The remote access client 102 and the VPN software processing component 301 agree on utilising digital signatures for authenticating each other and an algorithm for computing the digital signatures, in addition to the other parameters forming part of the initial SA parameter negotiation. After establishing the SA parameters, the remote access client 102 and the VPN software processing component 301 exchange an initiator key (KE$_i$), an initiator random number (Nonce$_i$), a responder key (KE$_r$) and a responder random number (Nonce$_r$) at steps 8.3 and 8.4. In response to receiving the responder key (KE$_r$) and the responder random number (Nonce$_r$), the remote access client 102 generates the key data for securing further communication messages.

The key data per the digital signature authentication mode in IKE v1 is generated as follows:

$$SKEYID = prf(Nonce_i | Nonce_r, KE_i KE_r)$$

$$SKEYID\_d = prf(SKEYID, KE_i KE_r | cookie\text{-}I | cookie\text{-}R | 0)$$

$$SKEYID\_a = prf(SKEYID, SKEYID\_d | KE_i KE_r | cookie\text{-}I | cookie\text{-}R | 1)$$

$$SKEYID\_e = prf(SKEYID, SKEYID\_a | KE_i KE_r | cookie\text{-}I | cookie\text{-}R | 2)$$

where $KE_i KE_r$ is the shared secret.

As in the pre-shared secret authentication mode, the remote access client 102 and the VPN software processing component 301 also generates an initiator hash (Hash$_i$) and a responder hash (Hash$_r$). The hashes are computed as follows:

$$Hash_i = prf(SKEYID, KE_i | KE_r | cookie\text{-}I | cookie\text{-}R | SA | ID_i)$$

$$Hash_r = prf(SKEYID, KE_r | KE_i | cookie\text{-}R | cookie\text{-}I | SA | ID_r)$$

where $KE_i$ and $KE_r$ are public values of the initiator and responder keys.

The remote access client 102 then generates an initiator digital signature (Sig$_i$) on the basis of a digital signature algorithm agreed during the initial SA parameter negotiation. The initiator digital signature is computed over the initiator hash. The remote access client 102 encrypts the digital signature, an initiator ID and an initiator certificate with the key SKEYID_e, and transmits these encrypted values along with an unencrypted header to the VPN software processing component 301. The initiator certificate is the public key certificate of the remote access client 102, and is utilised by the VPN software processing component 301 to verify the initiator signature. Sending the certificate is optional, and in the event that the certificate is not included in the message at step 8.6, the VPN software processing component 301 acquires the initiator certificate from a certificate retention entity.

In response to receiving the message transmitted at step 8.6, the VPN software processing component 301 computes the key data and authenticates the remote access client 102. The authentication is performed on the basis of the digital signature. In the event that the remote access client 102 is successfully authenticated, the VPN software processing component 301 computes the responder hash (Hash$_r$) and the responder signature (Sig$_r$). The VPN software processing component 301 further encrypts the responder signature (Sig$_r$), the responder certificate (Cert$_r$) and the private network ID (ID$_r$) with the key SKEYID_e, and transmits the encrypted data to the remote access client 102 (step 8.8), which then authenticates the private network 105 on the basis of the responder signature.

The VPN software processing component 301 then transmits the key data to actual point of presence of the private network, such as the gateway 103 (step 8.9).

Figure 9:
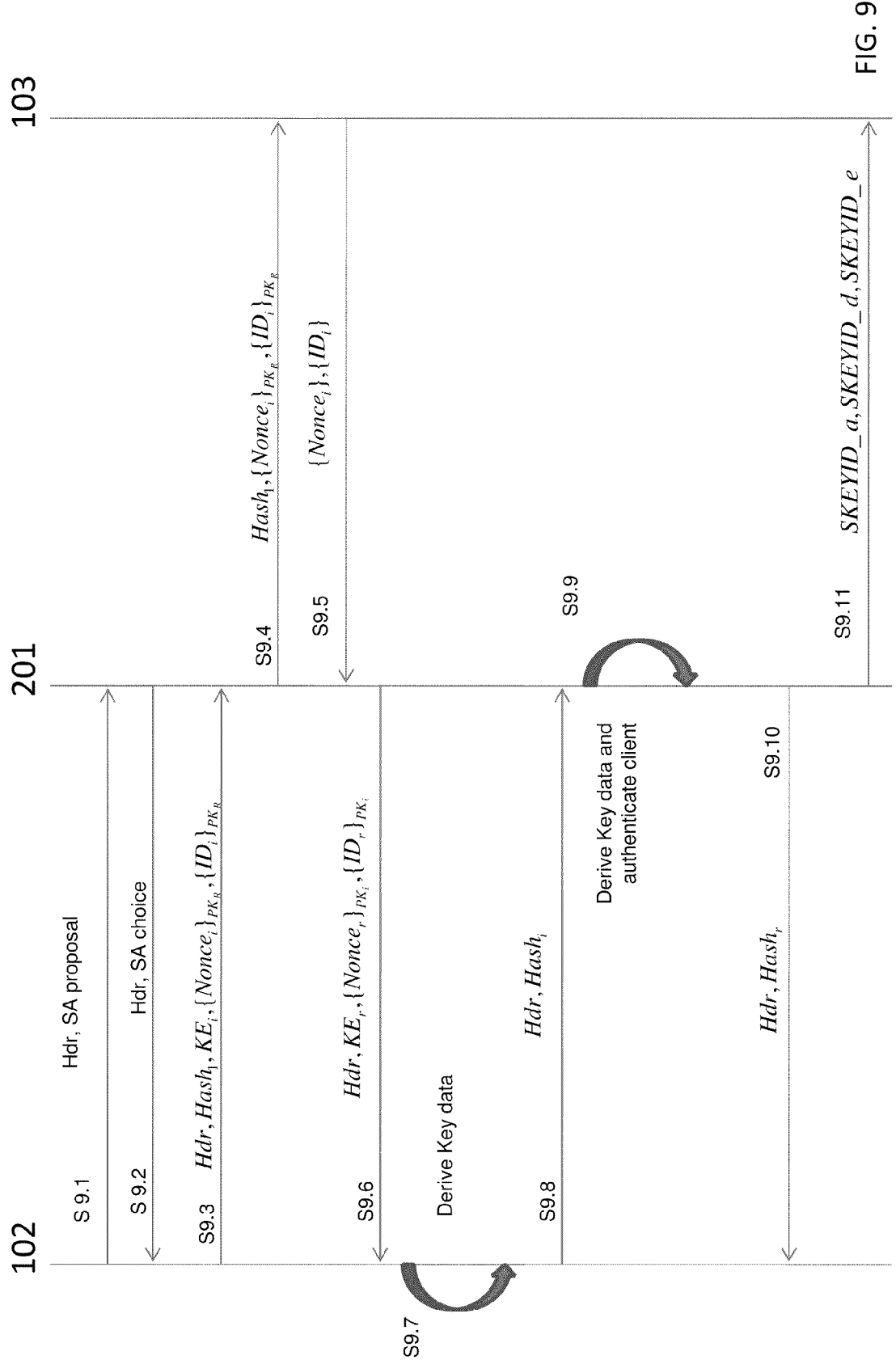
FIG. 9 is a timing diagram showing steps performed by the components shown in FIG. 2 when operating in accordance with IKEv1 public key encryption based client authentication.

FIG. 9 describes the establishment of an SA per public key encryption based authentication in IKE v1 and provides yet another mode of client authentication. As in the pre-shared secret based authentication, the SA establishment process begins by carrying out an SA parameter negotiation at steps 9.1 and 9.2. As per the example in FIG. 9, the remote access client 102 and the VPN software processing component 301 agree on utilising public key encryption for authenticating each other, in addition to the other parameters forming part of the initial SA parameter negotiation. Once the remote access client 102 and the VPN software processing component 301 agree on the public key encryption based authentication, the remote access client 102 acquires a public key certificate comprising a public key of the private network 105 from a certificate retention entity. After acquiring the private network's 105 public key certificate, the remote access client 102 encrypts an initiator random number (Nonce$_i$) and an initiator identification (ID$_i$) with the public key of the private network 105 ($PK_R$). The encrypted data is transmitted to the VPN software processing component 301, along with an unencrypted header, an unencrypted initiator key ($KE_i$) and a first hash ($Hash_1$). The first hash is the hash of the private network's 105 public key certificate containing the public key of the private network 105. The first hash is optional, and is used for informing a responder which of the public keys is used to encrypt the initiator random number and the initiator ID.

As the initiator random number and the initiator ID are encrypted with the public key of the private network 105, the initiator random number and the initiator ID can only be decrypted with the private network's 105 private key.

In the arrangement in which the global server 201 has access to the private key of the private network 105, the VPN software processing component 301 decrypts the initiator ID and the initiator random number.

In a further arrangement, such as where the global server 201 does not have access to the private key of the private network 105, the VPN software processing component 301 at step 9.4 transmits the first hash, the encrypted initiator random number and the encrypted initiator ID to the actual point of presence of the private network 105, such as the gateway 103. The gateway then decrypts the encrypted initiator random number and the encrypted initiator ID.

In a yet further arrangement, such as where the gateway 103 is arranged to send the decrypted initiator random number and the decrypted initiator ID to the VPN software processing component 301 in an unencrypted form, the gateway at step 9.5 transmits the decrypted initiator random number and the decrypted initiator ID to the VPN software processing component 301.

In a yet further arrangement, such as where the gateway 103 is arranged to send the decrypted initiator random number and the decrypted initiator ID to the VPN software processing component 301 in an encrypted form, the gateway 103 encrypts the decrypted initiator random number and the decrypted initiator ID with a secret shared key, and transmits the re-encrypted initiator ID and the re-encrypted initiator random number to the VPN software processing component 301 at step 9.5. In response to receiving the re-encrypted initiator ID and the re-encrypted initiator random number, the VPN software processing component 301 decrypts the re-encrypted initiator ID and the re-encrypted initiator random number with the secret shared key.

Once the VPN software processing component 301 has access to the decrypted initiator ID, the VPN software processing component 301 acquires a public key certificate comprising a public key of the remote access client 102 from a certificate retention entity on the basis of the initiator ID. Once the VPN software processing component 301 has acquired the public key of the remote access client 102, the VPN software processing component 301 encrypts a private network ID ($ID_r$) and a responder random number ($Nonce_r$) with the public key of the remote access client 102. In the event that the VPN software processing component 301 does not have access to the private network ID, the VPN software processing component 301 acquires the private network ID from an actual point of presence of the private network 105, such as the gateway 103. The VPN software processing component 301 at step 9.6 transmits the encrypted data along with an unencrypted header and an unencrypted responder key ($KE_r$) to the remote access client 102.

In response to receiving the message at step 9.6, the remote access client 102 decrypts the responder ID and the responder random number. The remote access client 102 can then calculate the key data as follows—

$$SKEYID = prf(hash(Nonce_i|Nonce_r), cookie\text{-}I|cookie\text{-}R)$$

$$SKEYID\_d = prf(SKEYID, KE_iKE_r|cookie\text{-}I|cookie\text{-}R|0)$$

$$SKEYID\_a = prf(SKEYID, SKEYID\_d|KE_iKE_r|cookie\text{-}I|cookie\text{-}R|1)$$

$$SKEYID\_e = prf(SKEYID, SKEYID\_a|KE_iKE_r|cookie\text{-}I|cookie\text{-}R|2)$$

where $KE_iKE_r$ is the shared secret.

The hash function in the computation of SKEYID is a hash algorithm that was agreed during the initial SA parameter negotiation.

As in the pre-shared secret authentication mode, the remote access client 102 also generates an initiator hash ($Hash_i$) and a responder hash ($Hash_r$) as follows:

$$Hash_i = prf(SKEYID, KE_i|KE_r|cookie\text{-}I|cookie\text{-}R|SA|ID_i)$$

$$Hash_r = prf(SKEYID, KE_r|KE_i|cookie\text{-}R|cookie\text{-}I|SA|ID_r)$$

where $KE_i$ and $KE_r$ are public values of the initiator and responder keys.

In response to the successful generation of the initiator hash, the remote access client 102 transmits the initiator hash and a header to the VPN software processing component 301 at step 9.8.

In response to receiving the initiator hash, the VPN software processing component 301 generates the key data and a responder hash ($Hash_r$). It will be understood that VPN software processing component 301 can generate the key data at any stage between steps 9.6 and 9.9, and the VPN software processing component 301 derives the key data in the same manner as the remote access client 102 at step 9.7. The VPN software processing component 301 then generates the initiator hash to authenticate the remote access client 102. In the event that the authentication is successful, the VPN software processing component 301 generates the responder hash and transmits the responder hash to the remote access client 102 (step 9.10), which is then utilised by the remote access client 102 to authenticate the private network 105. The VPN software processing component 301 also transmits the key data to the actual point of presence of the private network 105, such as the gateway 103 (step 9.11).

Figure 10:
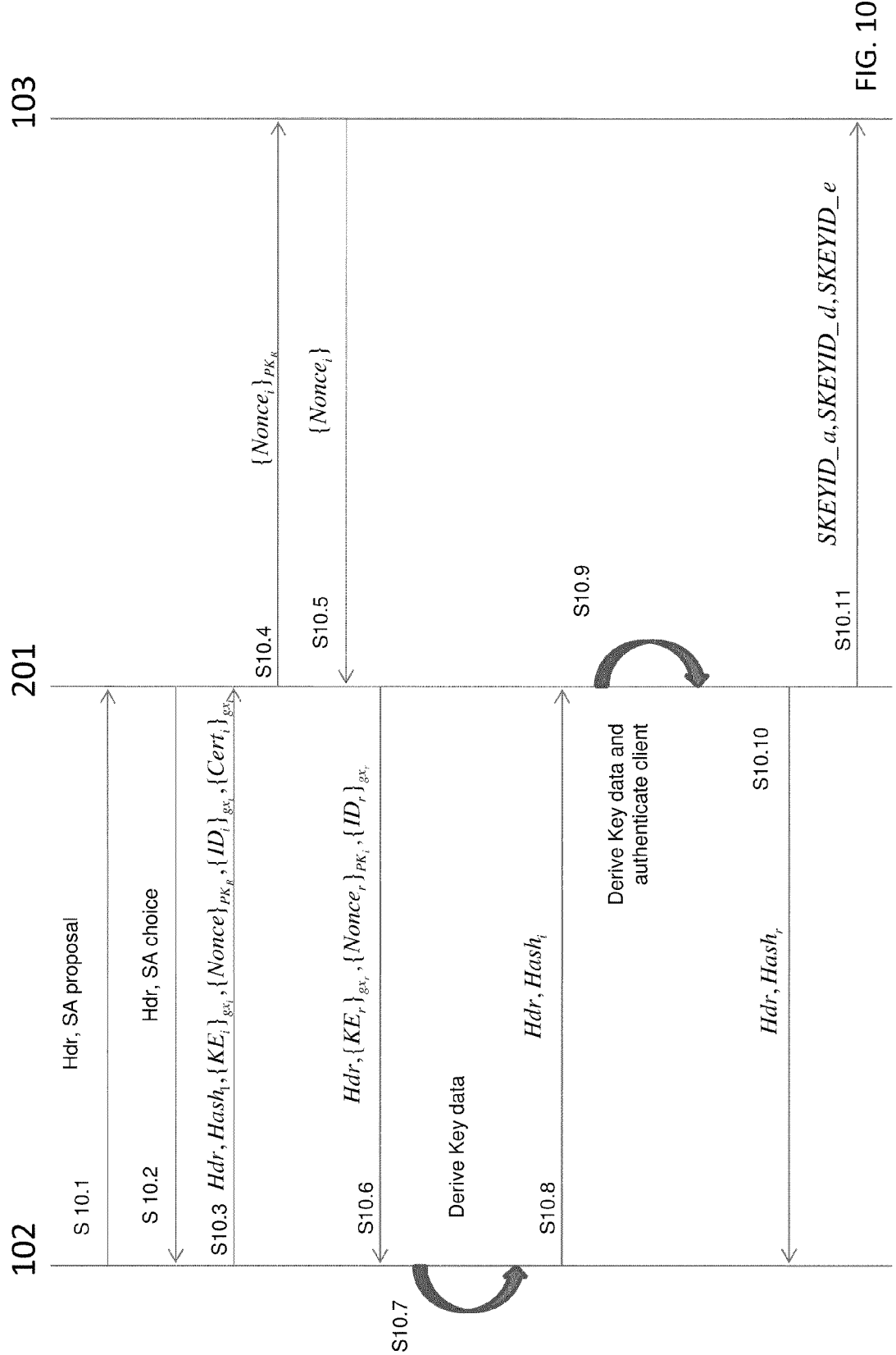
FIG. 10 is a timing diagram showing steps performed by the components shown in FIG. 2 when operating in accordance with IKEv1 revised public key encryption based client authentication.

FIG. 10 describes the establishment of an SA per revised public key encryption based authentication in IKE v1 and is a still further mode of client authentication. As in the public key encryption based authentication method, the SA establishment process begins by carrying out an SA parameter negotiation at steps 10.1 and 10.2. The remote access client 102 and the VPN software processing component 301 agree on utilising the revised public key encryption for authenticating each other, in addition to the other parameters forming part of the initial SA parameter negotiation. Once the remote access client 102 and the VPN software processing component 301 agree on the revised public key encryption based authentication, the remote access client 102 acquires a public key certificate comprising a public key of the private network 105 from a certificate retention entity. After acquiring the private network's 105 public key certificate, the remote access client 102 encrypts an initiator random number ($Nonce_i$) with the public key of the private network 105 ($PK_R$). Then the remote access client 102 calculates an initiator symmetric key as follows:

$$gx_i = prf(Nonce_i, cookie\text{-}I)$$

The remote access client 102 subsequently encrypts an initiator key ($KE_i$), an initiator ID ($ID_i$) and an initiator public key certificate ($Cert_i$) comprising an initiator public key with the initiator symmetric key. The remote access client 102 then transmits an unencrypted header, along with the symmetric key encrypted data and the public key encrypted initiator random number to the VPN software processing component 301.

In the arrangement in which the global server 201 has access to the private key of the private network 105, the VPN software processing component 301 decrypts the initiator random number.

In a further arrangement, such as where the global server 201 does not have access to the private key of the private network 105, the VPN software processing component 301 at step 10.4 transmits the first hash and the encrypted initiator random number to the actual point of presence of the private network 105, such as the gateway 103. The gateway then decrypts the encrypted initiator random number.

In a yet further arrangement, such as where the gateway 103 is arranged to send the decrypted initiator random number to the VPN software processing component 301 in an unencrypted form, the gateway at step 10.5 transmits the decrypted initiator random number to the VPN software processing component 301.

In a yet further arrangement, such as where the gateway 103 is arranged to send the decrypted initiator random number to the VPN software processing component 301 in an encrypted form, the gateway 103 encrypts the decrypted initiator random number with a secret shared key, and the transmit the re-encrypted initiator random number to the VPN software processing component 301 at step 10.5. In response to receiving the re-encrypted initiator random number, the VPN software processing component 301 decrypts the re-encrypted initiator random number with the secret shared key.

Once the VPN software processing component 301 has access to the decrypted initiator random number, the VPN software processing component 301 derives the initiator symmetric key, using the same computation process as used by the remote access client 102. After deriving the initiator symmetric key, the VPN software processing component 301 decrypts the encrypted initiator key, the encrypted initiator ID and the encrypted initiator public key certificate.

The VPN software processing component 301 then derives a responder symmetric key ($gx_r$) on the basis of a responder random number ($Nonce_r$) as follows:

$$gx_r = prf(Nonce_r, cookie-R)$$

The VPN software processing component 301 then encrypts an ID of the private network ($ID_r$) and a responder key ($KE_r$) with the responder symmetric key, and the responder random number with the remote access client's 105 public key. In the event that the VPN software processing component 301 does not have access to the private network ID, the VPN software processing component 301 acquires the private network ID from an actual point of presence of the private network 105, such as the gateway 103. The VPN software processing component 301 then transmits the encrypted data and an unencrypted header to the remote access client 102 at step 10.6.

In response to receiving the encrypted data, the remote access client 102 decrypts the responder random number using its private key. Once the responder random number has been decrypted, the remote access client 102 derives the responder symmetric key using the same computation process as used by the VPN software processing component 301.

After deriving the responder symmetric key, the remote access client decrypts the responder ID and the responder key.

The remote access client 102 then calculates the key data as follows—

$$SKEYID = prf(hash(Nonce_i|Nonce_r), cookie-I|cookie-R)$$

$$SKEYID\_d = prf(SKEYID, KE_iKE_r|cookie-I|cookie-R|0)$$

$$SKEYID\_a = prf(SKEYID, SKEYID\_d|KE_iKE_r|cookie-I|cookie-R|1)$$

$$SKEYID\_e = prf(SKEYID, SKEYID\_a|KE_iKE_r|cookie-I|cookie-R|2)$$

where $KE_iKE_r$ is the shared secret.
The hash function in the computation of SKEYID is a hash algorithm that was agreed during the initial SA parameter negotiation.

As in the pre-shared secret authentication mode, the remote access client 102 also generates an initiator hash ($Hash_i$) and a responder hash ($Hash_r$) as follows:

$$Hash_i = prf(SKEYID, KE_i|KE_r|cookie-I|cookie-R|SA|ID_i)$$

$$Hash_r = prf(SKEYID, KE_r|KE_i|cookie-R|cookie-I|SA|ID_r)$$

where $KE_i$ and $KE_r$ are public values of the initiator and responder keys.

In response to the successful generation of the initiator hash, the remote access client 102 transmits the initiator hash and a header to the VPN software processing component 301 at step 10.8.

In response to receiving the initiator hash, the VPN software processing component 301 generates the key data, the initiator hash ($Hash_i$) and a responder hash ($Hash_r$). It will be understood that VPN software processing component 301 can generate the key data, the initiator hash and the responder hash at any stage between steps 10.6 and 10.9, and the VPN software processing component 301 derives the key data in the same manner as the remote access client 102 at step 10.7.

The VPN software processing component 301 utilises the initiator hash to authenticate the remote access client 102. In the event that the authentication is successful, the VPN software processing component 301 transmits the key data to the actual point of presence of the private network 105, such as the gateway 103. The VPN software processing component 301 also transmits the generated responder hash ($Hash_r$) to the remote access client 102, which is then utilised by the remote access client 102 to authenticate the private network 105.

Figure 11:
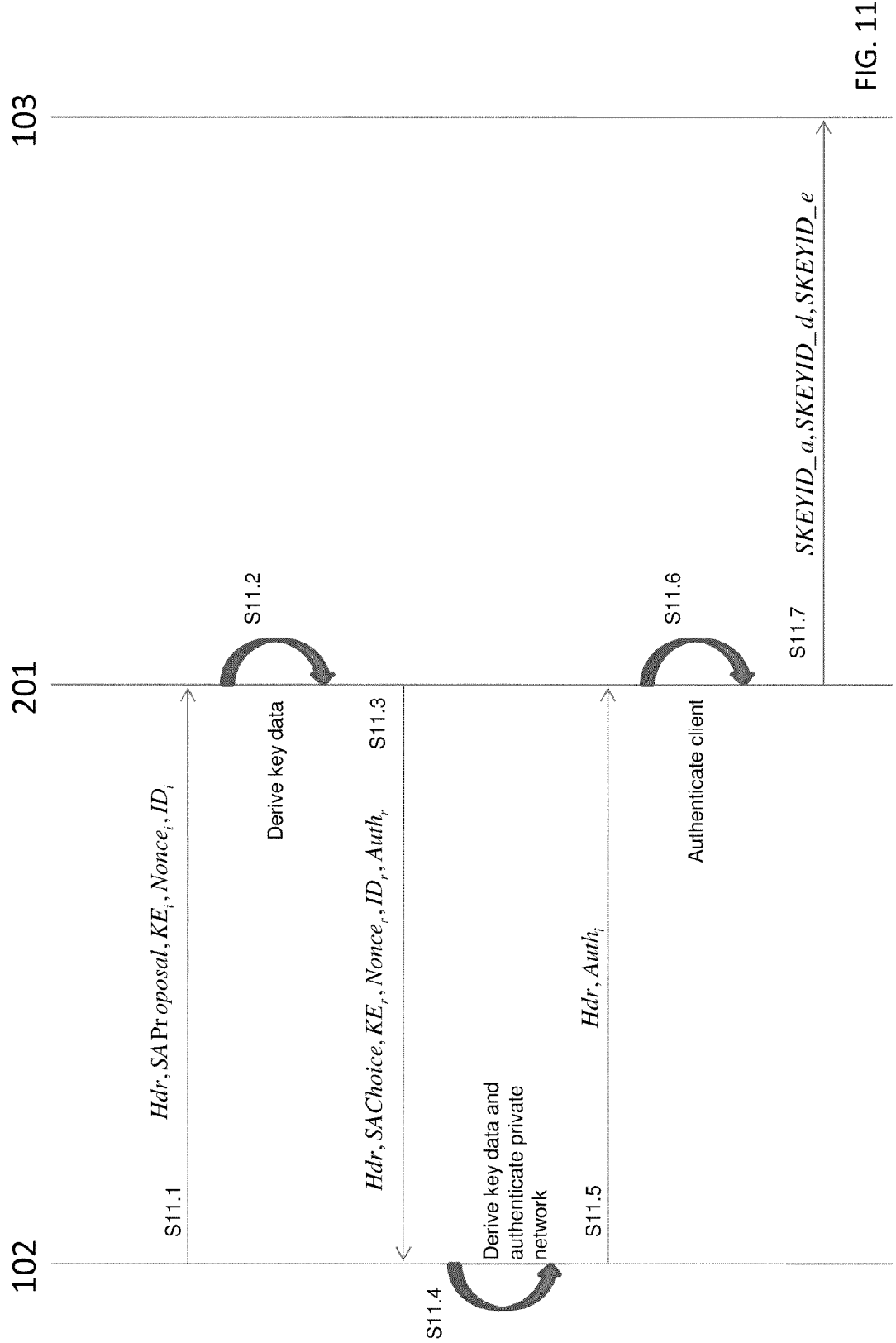
FIG. 11 is a timing diagram showing steps performed by the components shown in FIG. 2 when operating in accordance with IKEv1 aggressive mode.

FIG. 11 describes establishment of the initial SA per an aggressive mode IKE v1 message exchange and thus differs from the earlier embodiments in that this embodiment requires fewer messages to be exchanged to establish an SA than the previous embodiments. The message exchange begins with the remote access client 102 transmitting a first message comprising a list of proposals for forming an initial SA between the remote access client 102 and the private network 105 (step 11.1). In addition to the SA proposals, the first message comprises an initiator key ($KE_i$), an initiator random number ($Nonce_i$), an initiator ID ($ID_i$) and a header. It will be understood by a person skilled in the art that the contents of the first message may be encrypted with a private network public key or a responder symmetric key.

Since the global server 201 acts as point of presence for the private network 105, the first message is received by the VPN software process component 301. In response to receiving the message, the VPN software processing component 301 derives a responder random number (Nonce$_r$) and a responder key (KE$_r$), and computes a key data (step 11.2). As discussed above, the computation of the key data is dependent on the authentication method agreed between the remote access client 102 and the VPN software process component 301.

In the arrangement in which the authentication protocol is the pre-shared key protocol, the key data is generated as follows:

SKEYID=prf(preshared-key|Nonce$_i$|Nonce$_r$)

SKEYID_$d$=prf(SKEYID,KE$_i$KE$_r$|cookie-$I$|cookie-$R$|0)

SKEYID_$a$=prf(SKEYID, SKEYID_$d$|KE$_i$KE$_r$|cookie-$I$|cookie-$R$|1)

SKEYID_$e$=prf(SKEYID, SKEYID_$a$|KE$_i$KE$_r$|cookie-$I$|cookie-$R$|2)

where KE$_i$KE$_r$ is the shared secret.

The VPN software processing component 301 then derives a responder authentication data. As discussed above, the authentication data is dependent on the agreed authentication mechanism. For example, if the agreed authentication mechanism is the pre-shared secret, then the authentication data is derived as follows:

Hash$_i$=prf(SKEYID,KE$_i$|KE$_r$|cookie-$I$|cookie-$R$|SA|ID$_i$)

Hash$_r$=prf(SKEYID,KE$_r$|KE$_i$|cookie-$R$|cookie-$I$|SA|ID$_r$)

where, Hash$_i$ is the initiator authentication data, the Hash$_r$ is the responder authentication data and KE$_i$ and KE$_r$ are public values of the initiator and responder keys.

In response to successfully deriving the responder authentication data, the VPN software processing component 301 transmits a second message comprising a chosen SA proposal from the list of proposals offered by the remote access client 102, the responder key, the responder random number, an ID of the private network 105 and the responder authentication data (step 11.3). In the event that the VPN software processing component 301 does not have access to the private network ID, the VPN software processing component 301 acquires the private network ID from an actual point of presence of the private network 105, such as the gateway 103.

In response to receiving the second message, the remote access client 102 derives the key data, the initiator authentication data and the responder authentication data using the same processes as used by the VPN software processing component 301 (step 11.4). The remote access client 102 then authenticates the private network 105, and in response to successful authentication, transmits the initiator authentication data (Auth$_i$) to the VPN software processing component 301 (step 11.5).

In response to receiving the initiator authentication data, the VPN software processing component 301 authenticates the remote access client 102 (step 11.6), and in response to successful authentication, transmits the key data to the private network 105 (step 11.7).

Figure 12:
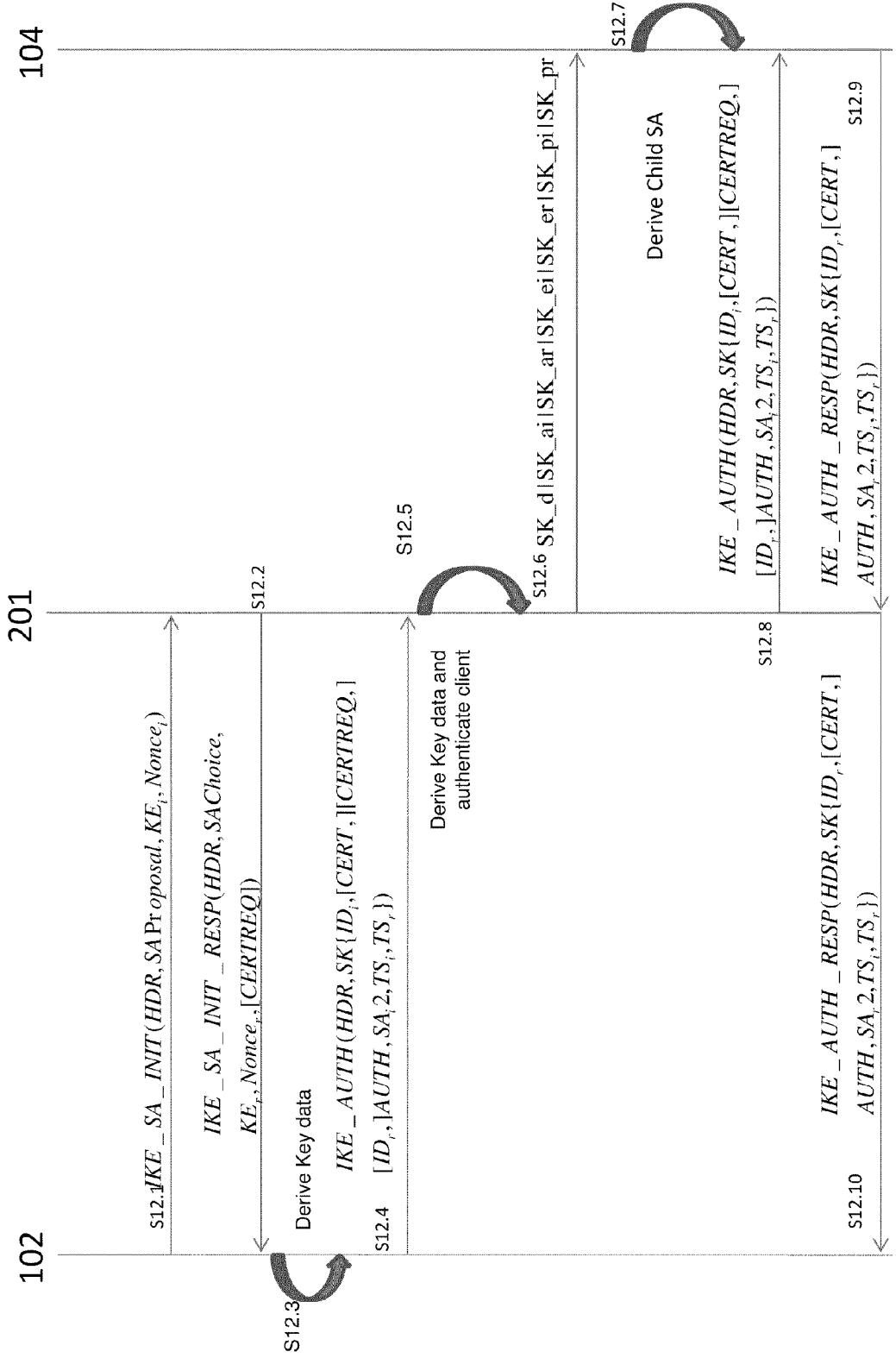
FIG. 12 is a timing diagram showing steps performed by the components shown in FIG. 2 when operating in accordance with IKEv2.

Turning to FIG. 12, an establishment of an initial SA per the IKE version 2 is described in detail. The remote access client 102 initiates the message exchange by transmitting an IKE_SA_INIT message comprising a header, a list of proposals for forming the initial SA, an initiator key (KE$_i$) and an initiator random number (Nonce$_i$) (step 12.1). The remote access client 102 transmits the IKE_SA_INIT message to a point of presence of the private network 105. Since the global server 201 is acting as a point of presence of the private network 105, the IKE_SA_INIT message is received and processed by the VPN software processing component 301.

In response to receiving the IKE_SA_INIT message, the VPN software processing component 301 prepares a message IKE_SA_INIT_RESP. The IKE_SA_INIT_RESP message comprises a header, a chosen SA proposal from the list of proposals offered by the remote access client 102, a responder key, a responder random number and a certificate request (step 12.2). The certification request in the IKE_SA_INIT_RESP is optional.

Then the remote access client 102 and the VPN software processing component 301 derive a shared key seed (SKEYSEED) as follows:

SKEYSEED=prf(Nonce$_i$|Nonce$_r$,g$^{ir}$)

where, g$^{ir}$ is the shared secret from the message exchange (KE$_i$ and KE$_r$), and is represented as a string of octets in big endian order padded with zeros if necessary to make it the length of the modulus.

The remote access client 102 and the VPN software processing component 301 then calculate seven further secrets (steps 12.3 and 12.5), or the key data as follows:

{SK_$d$|SK_$ai$|SK_$ar$|SK_$ei$|SK_$er$|SK_$pi$|SK_$pr$}=prf+(SKEYSEED, Nonce$_i$|Nonce$_r$|SAProposal|SAChoice)

The quantities SK_d, SK_ai, SK_ar, SK_ei, SK_er, SK_pi, and SK_pr are taken in order from the generated bits of the function prf+. The key SK_d used for deriving new keys for further child SAs established under this initial SA. The keys SK_ai and SK_ar used as a key to the integrity protection algorithm for authenticating the component messages of subsequent exchanges. The keys SK_ei and SK_er used for encrypting and decrypting any further messages. The keys SK_pi and SK_pr are used when generating authentication data. The two directions of traffic flow use different keys: the keys used to protect messages from the remote access client 102 are SK_ai and SK_ei, and the keys used to protect messages from the private network 105 are SK_ar and SK_er.

In response to successfully generating the key data, the remote access client 102 encrypts data comprising a remote access client ID, a remote access client certificate, a request for private network certificate, a remote network client authentication data, a list of proposals for forming a child SA, or a further SA, and a set of traffic selectors with the key SK_ei. The remote access client certificate is included in the message IKE_SA_INIT_RESP, if the certificate was requested in the message IKE_SA_INIT_RESP at step 12.2. The certificate request in the message IKE_SA_INIT_RESP is optional. It will be understood by a person skilled in the art that the authentication data is based on a particular authentication algorithm agreed between the remote access client 102 and the VPN software processing component 301 as part of the chosen SA proposal. The list of proposals for forming a child SA relate to a further SA that is derived on the basis of this message exchange and the set of traffic selectors define the traffic policy for the proposed child SA.

The remote access client 102 then transmits an IKE_AUTH message comprising an unencrypted header and the encrypted data to the VPN software processing component 301 (step 12.4).

In response to receiving the IKE_AUTH message, the VPN software processing component 301 decrypts the authentication data and verifies the authentication data. In the event that the authentication data is not successfully verified, the VPN software processing component 301 denies the request for establishing an SA between the remote access client 102 and the private network 105.

In the event that the remote access client's 102 authentication data is successfully verified, the VPN software processing component 301 transmits a message comprising the key data, the remote access client ID, the proposal for forming the child SA (SA$_r$2) and the set of traffic selectors (TS$_i$, TS$_r$) to an actual point of presence of the private network 105 (steps 12.6 and 12.8).

In the arrangement in which the actual point of presence of the private network 105 is the gateway 103, the gateway 103, responsive to receiving the message from the VPN software processing component 301, derives a keying material for the child SA on the basis of the proposal and the set of traffic selectors. The keying material for the child SA is derived as follows:

KEYMAT=prf+(SK_d,Nonce$_i$|Nonce$_r$)

The gateway 103 also derives authentication data in relation to the private network 105 on the basis of the authentication algorithm agreed between the remote access client 102 and the VPN software processing component 301. The gateway 103 then encrypts a private network ID, a private network certificate, the private network authentication data, a chosen proposal from the list of proposals relating to the child SA (SA$_r$2) and a set of child SA traffic selectors (TS$_i$, TS$_r$) with the key SK_er, and transmit the encrypted data to the VPN software processing component 301 in a message IKE_AUTH_RESP (step 12.9).

In response to receiving the IKE_AUTH_RESP message, the VPN software processing component 301 forwards the message to the remote access client 102, which then authenticates the private network 105 on the basis of the contained authentication data and derives the child SA (step 12.10).

In the event that the private network 105 is successfully authenticated by the remote access client 102, the private network 105 and the remote access client 105 have successfully established an initial SA and a child SA via a proxy negotiator, namely the global server 201.

The successful authentication of the communicating hosts, i.e. the remote access client 102 and the private network 105, and generation of the key data relating to the initial SA marks the end of phase 1 of IKE message exchange in both IKE versions 1 and 2. The IKE v2 also yields a child SA, in addition to the successful authentication and the generation of key data.

However, it will be appreciated that the authentication of the remote access client 102 does not include authenticating a user, who is in control of the remote access client 102 when the request for secured connection is initiated. The user authentication can be undertaken by any entity within the private network 105, such as the server 104 or the gateway 104, or an external trusted entity, such as the global server 201. The user authentication can be performed utilising a suitable authentication protocol, such as the Extended Authentication within IKE (XAUTH). The XAUTH mechanism is described in the IETF Internet Draft, entitled "Extended Authentication within IKE (XAUTH)", the contents of which are incorporated herein by reference.

In the arrangement in which the global server 201 is responsible for authenticating the user in control of the remote access client 102, the VPN software processing component 301, responsive to successful authentication of the remote access client 102, requests user authentication credentials, such as a username and password. The request for user authentication can be piggybacked with a message comprising the authentication data of the private network 105, such as the messages at steps 6.8, 7.8, 8.8, 9.10, 10.10, 11.3 and 12.10, or the request for user authentication credentials can be transmitted by the VPN software processing component 301 at any stage after the transmission of the private network 105 authentication data. In response to receiving the request for authentication credentials, the remote access client 102 acquires the user authentication credentials and transmits the acquired user credentials to the VPN software processing component 301. The VPN software processing component 301 verifies the received user authentication credentials, and transmits the results of the authentication to the remote access client 102, which may transmit a further message acknowledging the authentication result. In the event that the user is successfully authenticated, the VPN software processing component 301 allows the request for secured connection from the user of the remote access client 102 and transmits a message comprising the authentication result to the actual point of presence of the private network 105. Since these messages are exchanged after the establishment of the initial SA, these messages are encrypted by one of the keys SKEYID_E, SK_er or SK_ei from the key data relating to the initial SA.

Figure 13:
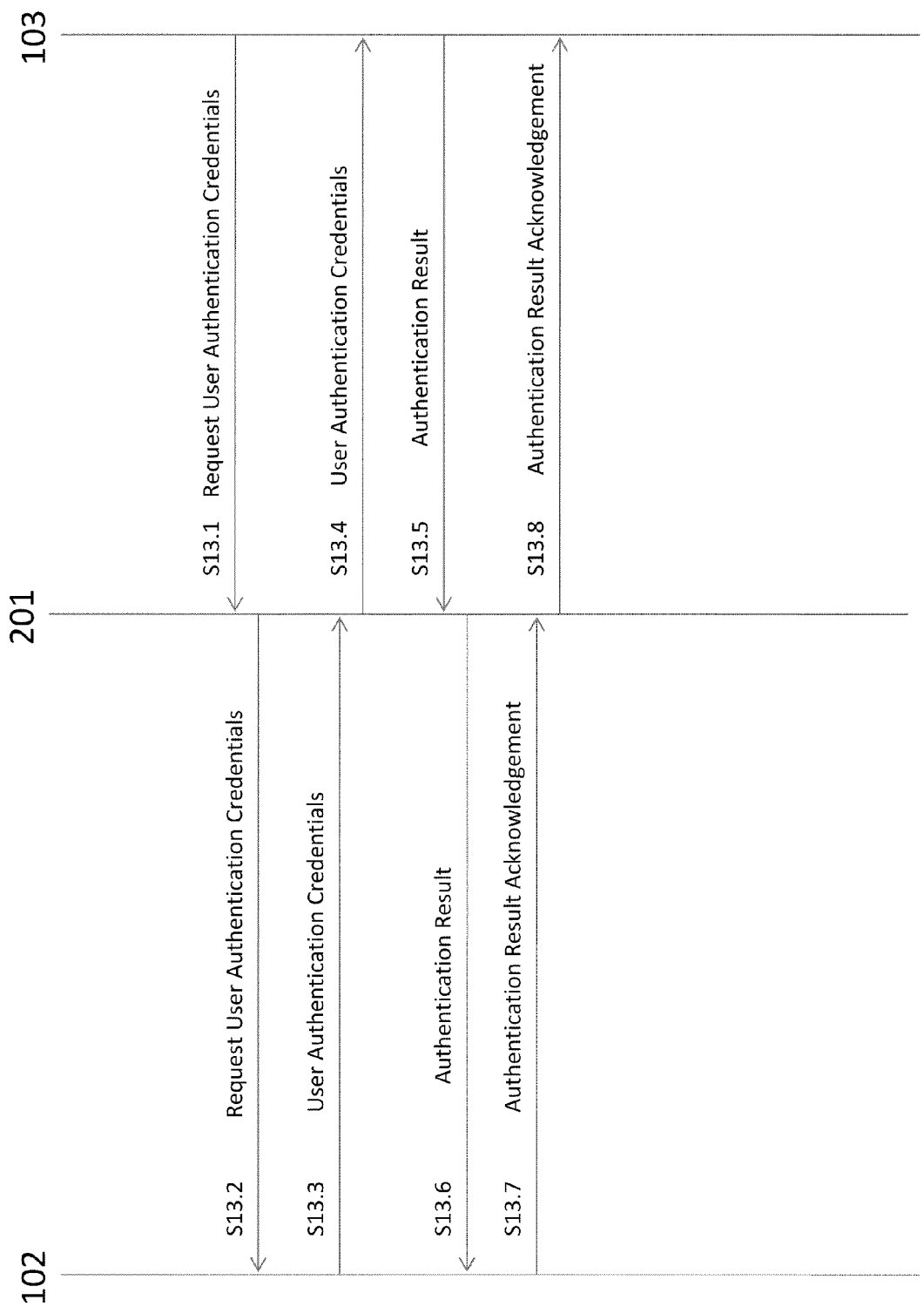
FIG. 13 is a timing diagram showing steps performed by the components shown in FIG. 2 when authenticating a user in IKE.

In a further arrangement, the gateway 103 is responsible for authenticating the user in control of the remote access client 102. This will now be described with reference to FIG. 13: the gateway 103, responsive to receiving the key data from the VPN software processing component 301, transmits a request for user authentication credentials at step 13.1. The message exchange for authenticating a user is encrypted by one of the keys SKEYID_e, SK_er or SK_ei from the key data relating to the initial SA. The request is received at the VPN software processing component 301, which further transmits the request to the remote access client 102. The remote access client 102 acquires the user authentication credentials from the user, and transmits the acquired user credentials to the VPN software processing component 301 at step 13.3. The VPN software processing component 301 relays the encrypted authentication credentials to the gateway 103 at step 13.4. The gateway 103 then verifies the authentication credentials of the user in control of the remote access client 102, and if successfully verified, the gateway 103 allows the secured connection request by the user of the remote access client 102. The gateway 103 then sends a message to the remote access client 102 via the VPN software processing component 301 comprising the authentication result at step 13.5. The remote access client 102 acknowledges the authentication result at step 13.7.

In the event that the user of the remote access client 102 and the remote access client 102 are successfully authenticated, the communicating hosts 102, 105 then initiate the message exchange to establish further SA's. As will be appreciated, per IKE version 2, a further SA, or child SA, is established as part of the initial SA message exchange. However, as discussed above, an IPSEC secured connection requires establishment of at least two further SAs. Thus, per both IKE versions 1 and 2, the communicating hosts 102, 105 negotiate at least one further SA.

To implement IPSec VPNs between the remote access clients 102 with dynamic IP addresses and the private network 105, the IPSec policies on the gateway 103 would have to be dynamically administered. This is because the IP address of a given remote access client 102 would change every time the given remote access client 102 establishes a secured connection with the private network 105. However, the dynamic administration of the IPSec policies can be avoided by providing a given authenticated remote access client 102 with connection settings in accordance with the private network 105. For example, a given remote access client with an IP address "192.168.0.25" is provided with a new IP address "150.0.0.2" per an inner IP address range of the private network 105. Since the inner IP address range is known to the policy administrating entities, such as a firewall 106, of the private network 105, the policy administrating entities of the private network would not have to be dynamically altered upon successful authentication of the given remote access client 102 with an IP address that is not within the inner IP address range of the private network 105. This assignment of the connecting settings can be performed at any stage after the establishment of the initial SA.

The known mode configuration message exchange described in the IETF Internet Draft, entitled "The ISAKMP Configuration Method" can be utilised to push the connection settings in accordance with the private network 105; this message exchange can be used to provision the remote access client 102 with settings such as the inner IP address range of the private network 105 (described above) and a private network DNS server's IP address.

Figure 14:
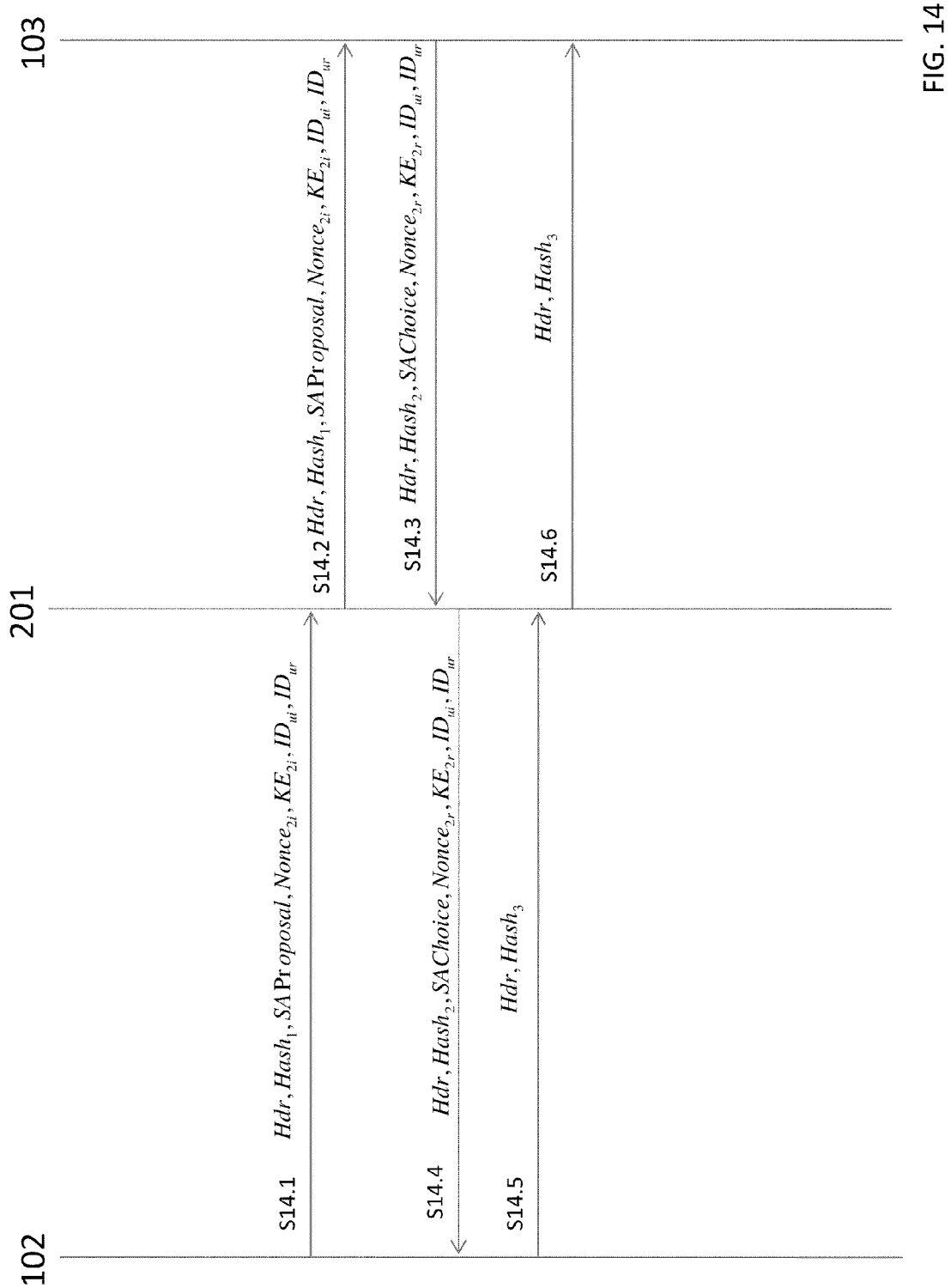
FIG. 14 is a timing diagram showing steps performed by the components shown in FIG. 2 when establishing a further security association (SA) in IKEv1.

FIG. 14 shows a message exchange for establishment of a further SA per IKE version 1. As in phase 1 IKE version 1, the message exchange for establishing a further SA, phase 2 message exchange, or quick mode message exchange, can be initiated by either of the communicating hosts 102, 105.

In the arrangement in which the message exchange for establishing a further SA is initiated by the remote access client 102, the remote access client 102 prepares a first message comprising a list of proposals for establishing a further SA and an initiator random number ($Nonce_{2i}$). The phase 2 message exchange provides the option of a Diffie-Hellman key exchange, as in phase 1, if perfect forward secrecy (PFS) is desired. In the event that the PFS is desired the first message further comprises an initiator key ($KE_{2i}$). The phase 2 message exchange can be performed by a proxy negotiator, such as the global server 201, on behalf of the communicating host. In the event that the phase 2 message exchange is being performed by a proxy negotiator, the first message further comprises the identity of the remote access client 102 ($ID_{ui}$) and/or an identity of the corresponding communicating host ($ID_{ur}$). The remote access client then encrypts the list of SA proposals, the initiator random number, the initiator key, if included, and the remote access client ID, if included, with the key SKEYID_e from the key data of the corresponding initial SA. The first message further comprises a first hash, which is generated as follows:

$Hash_1=prf(SKEYID\_a, message\text{-}ID|SAProposal|Nonce_{2i}|[KE_{2i}|ID_{ui}|ID_{ur}])$ where, the parameters in the bracket "[]" are optional, and are only included in the generation, if they have been included in the first message, and $KE_{2i}$ comprises public values of the initiator responder key.

The remote access client 102 further appends a header to the first message and, transmits the first message to the private network 105 via the VPN software processing component 301.

In the arrangement in which the gateway 103 is the actual point of presence of the private network 105, the VPN software processing component 301 routes the first message to the gateway 103 at step 14.2. In response to receiving the first message, the gateway 103 decrypts the contents of the first message and utilises the first hash to authenticate the first message. In the event that the message is successfully authenticated, the gateway 103 encrypts a chosen SA proposal from the list of SA proposals in the first message (SAChoice), a responder random number ($Nonce_{2r}$), a responder key ($KE_{2r}$), if an initiator key was included in the first message, and the ID's of the remote access client 102 ($ID_{ui}$) and the private network 105 ($ID_{ur}$), if ID data was included in the first message, with the key SKEYID_e from the key data of the corresponding initial SA. The gateway 103 adds a second hash and the encrypted data to a second message, the second hash ($Hash_2$) being generated as follows:

$Hash_2=prf(SKEYID\_a, message\text{-}ID|Nonce_{2i}|SAChoice|Nonce_{2r}|[KE_{2i}|ID_{ui}|ID_{ur}])$ where $KE_{2i}$ comprises public values of the initiator responder key.

The gateway 103 further adds a header to the second message, and transmits the second message to the remote access client 102 via the VPN software processing component 301 at step 14.3.

In response to receiving the second message, the remote access client 102 decrypts the encrypted data of the second message and utilises the second hash to authenticate the second message. In the event that the second message is successfully authenticated, the remote access client 102 generates a third hash ($Hash_3$) as follows:

$Hash_3=prf(SKEYID\_a, 0|message\text{-}ID|Nonce_{2i}|Nonce_{2r})$

The remote access client 102 adds the third hash to a third message, and transmits the third message to the gateway 103 via the VPN software processing component 301 at step 14.5.

In the event that the message exchange above is successful, the communicating host 102, 105, i.e. the remote access client 102 and the gateway 103, generates a key for securing communication sent under the negotiated further SA. The key for this generated SA is:

$KEYMAT=prf(SKEYID_d, [KE_{2i}KE_{2r}]|protocol|SPI|Nonce_{2i}|Nonce_{2r})$ where, SPI is the security parameter index and $KE_{2i}KE_{2r}$ is the shared secret. In the event that the keys $KE_{2i}$ and $KE_{2r}$ were not exchanged during the phase 2 message exchange, the initiator key ($KE_i$) and the responder key ($KE_r$) from the phase 1 message exchange are used for generation of the key KEYMAT.

Once the KEYMAT has been generated, further SA is considered to be established.

Figure 15:
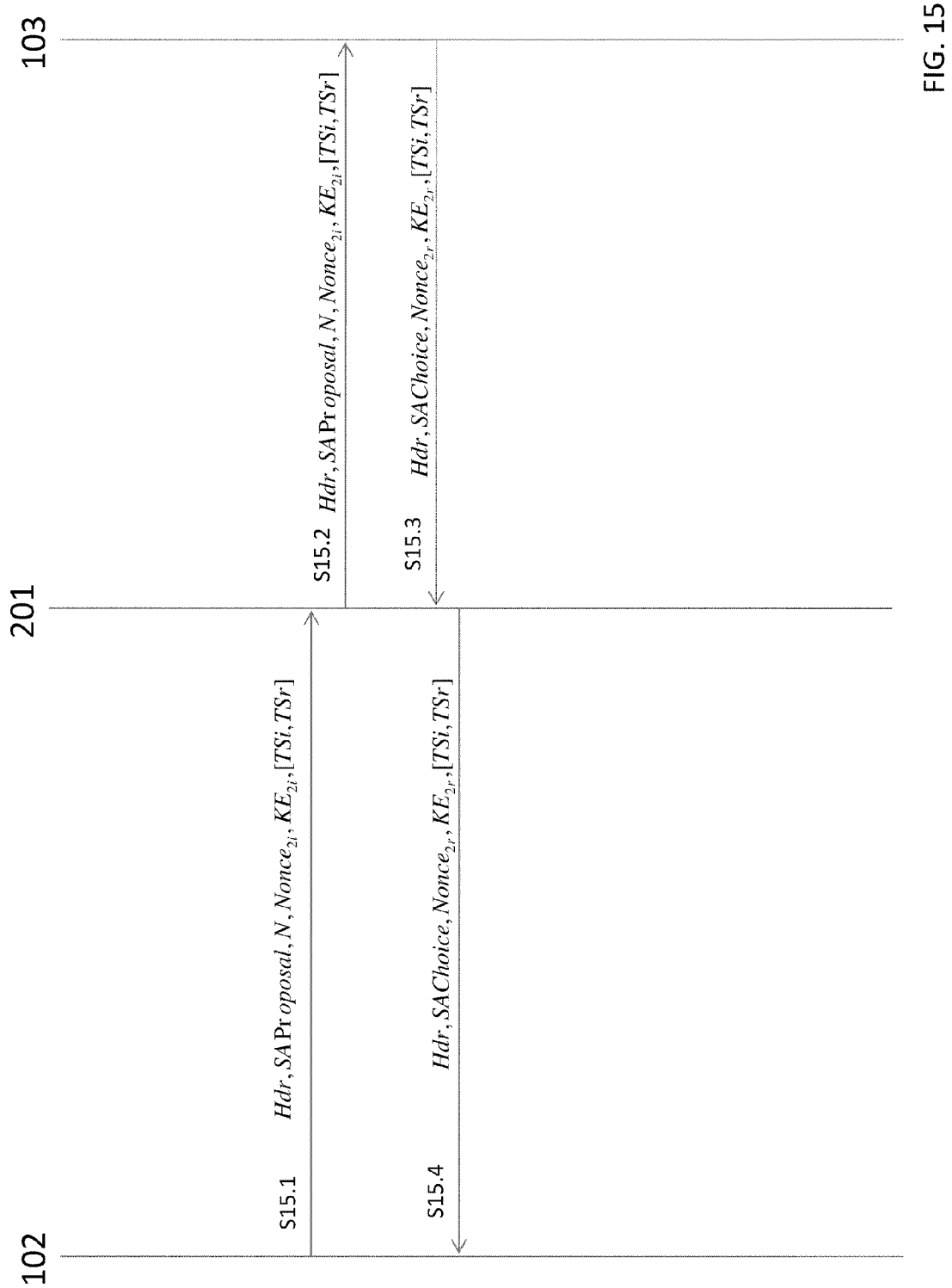
FIG. 15 is a timing diagram showing steps performed by the components shown in FIG. 2 when establishing a further SA in IKEv2.

FIG. 15 shows a message exchange for establishing a child SA per IKE version 2. The message exchange for establishing a further child SA, or a phase 2 message exchange, can be initiated by either of the communicating hosts 102, 105.

In the arrangement in which the phase 2 message exchange is initiated by the remote access client 102, the remote access client 102 encrypts data comprising a list of proposals for establishing a further SA, an indication to form a new further SA (N), an initiator random number ($Nonce_{2i}$) and a set of traffic selectors (TSi, TSr) for the further SA to be created, with the key SK_ei from the key data of the corresponding initial SA. In the event that the further SA is to be created on the basis of the algorithms agreed between the communicating hosts 102, 105 at steps 12.4 and 12.8, the indication to form a new further SA and the set of traffic selectors are not included in the encrypted data. In the event that PFS is desired, the encrypted data further comprises an initiator key ($KE_{2i}$). The remote access client 102 then generates a first message comprising a header and the encrypted data, and transmits the first message to the VPN software processing component 301 at step 15.1.

In the arrangement in which the actual point of presence of the private network 105 is the gateway 103, the VPN software processing component 301 transmits the first message to the gateway 103 at step 15.2. In response to receiving the first message, the gateway 103 decrypts the encrypted data and establishes whether the request relates to an establishment of a new further SA by verifying whether the request for a new further SA has been included in the message. In the event the first message does not relate to a request to establish a new further SA, the gateway 103 encrypts data comprising a responder random number (Nonce$_{2r}$), a responder key (KE$_{2r}$), if an initiator key was included in the first message, and a chosen SA proposal from the list of SA proposals (SAChoice), with the key SK_er from the key data relating to the initial SA.

In the event that the first message relates to a request to establish a new further SA, the encrypted data generated by the gateway 103 further comprises a set of traffic selectors (TSi, TSr).

The gateway 103 then generates a second message comprising the generated encrypted data and a header, and transmits the second message to the remote access client 102 via the VPN software processing component 301.

The successful reception of the second message at the remote access client 102 marks the end of the phase 2 message exchange. The communicating hosts 102, 105 then compute a key to secure data being transmitted under the created further SA.

In the event that PFS was not desired, the key for the created further SA is generated as follows:

$$KEYMAT=prf+(SK\_d,Nonce_{2i}|Nonce_{2r})$$

In the event that PFS is desired, the key for the created further SA is generated as follows:

$$KEYMAT=prf+(SK\_d,KE_{2i}KE_{2r},Nonce_{2i}|Nonce_{2r})$$

where $KE_{2i}KE_{2r}$ is the shared secret.

Figure 16:
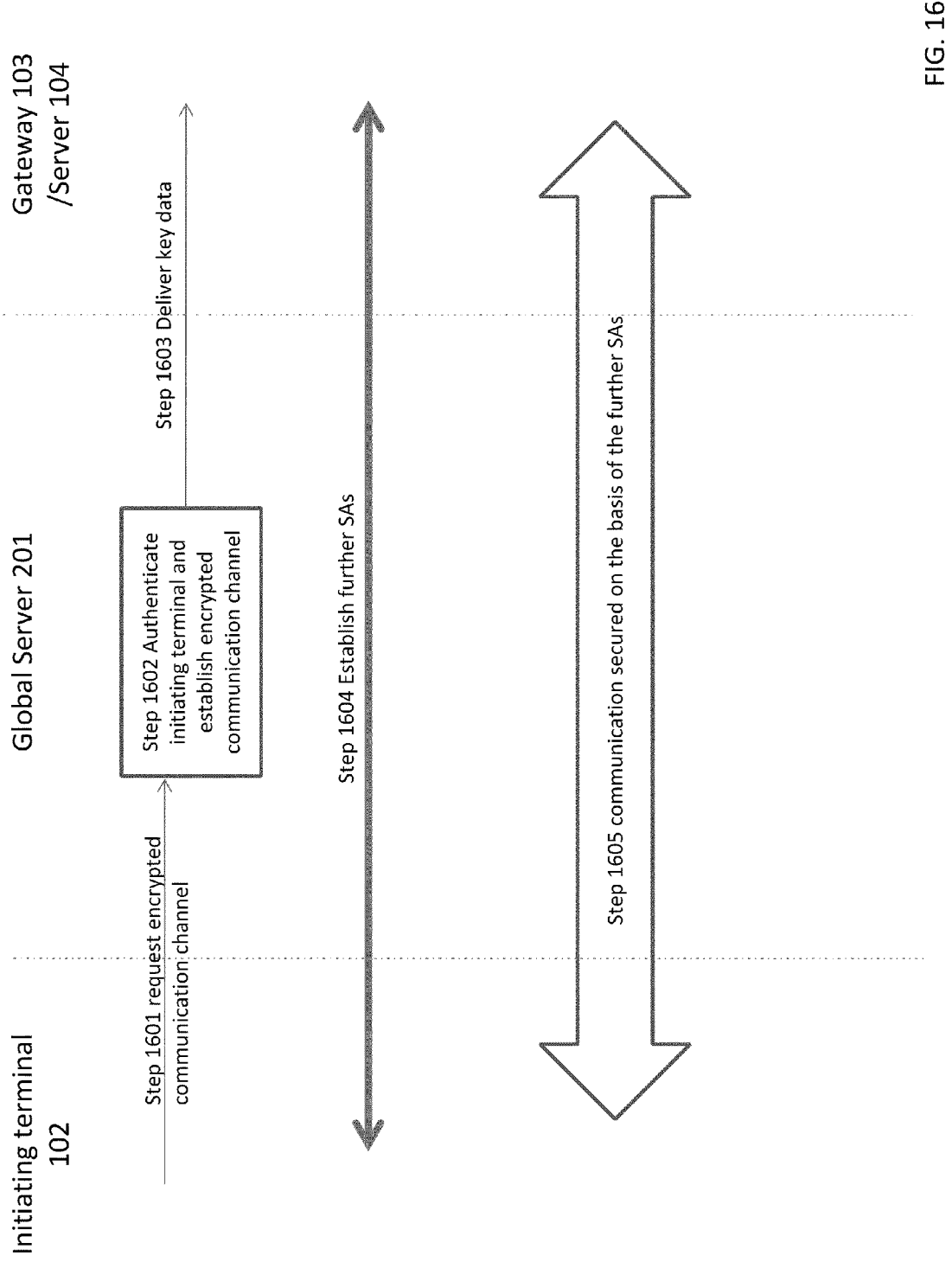
FIG. 16 is a flow diagram illustrating an overview of the encrypted channel establishment process.

Turning to FIG. 16, an overview of the process of providing an authorised user with secure access to services provided by the entities within the private network 105 is described. As discussed above, the VPN software processing component 301 authenticates an incoming request to establish an encrypted communications channel from a remote access client 102, and in the event that the remote access client 102 is successfully authenticated, the VPN software processing component 301 hands over control to the actual point of presence of the private network 105, thereby facilitating authenticated access to services provided by the private network 105.

At step 1601, the global server 201 receives a request for establishing an encrypted communication channel, an initial SA or a secured connection, by way of establishing an initial SA. The initial SA will be established by the VPN software processing component 301 and the remote access client 102 utilising the processes described in FIGS. 6 to 12.

In response to receiving the request, the VPN software processing component 301 identifies that the incoming request corresponds to the private network 105, i.e. the private network 105 is the terminating terminal, on the basis of data specifying a relationship between the remote access client 102 and the private network 105. The data specifying the relationship between the remote access client 102 and the private network 105 is stored by the global server 201 in the database DB1 or in an internal memory. The data specifying the relationship additionally identifies an actual point of presence of the private network, such as the gateway 103 and the server 104.

In at least some embodiments, the global server 201 further comprises a policy manager 302. The policy manager 302 is arranged to selectively perform the encrypted communication establishment process, for example of the basis of certain predetermined conditions. The predetermined condition extends the capability of the global server 201 by selectively allowing the incoming secured connection requests on the basis of a criterion other than the authentication parameter. One such predetermined condition is dependent on whether a given remote access client 102 has been scanned for the presence of malicious software. The requests originating from a given remote access client 102 are rejected in the event that the given remote access client 102 has not been scanned for the presence of malicious software. The policy manager 302 can further ensure that the results of the malicious software scan are compatible with the policies of the private network 105. In the event that the results are not compatible, the VPN software processing component 301 is arranged to reject the incoming request to establish an initial SA.

As discussed above, the VPN software processing component 301 maintains a record of the outcome of a secured connection request from a given remote access client 102. The policy manager 302 utilises the data identifying the outcome relating to a given remote access client 102 to verify whether the request for a further secured connection should be allowed on the basis of the data identifying the outcomes of previous requests for a secure connection originating from the given remote access client 102. For example a private network 105 may restrict access to remote access clients 102 with fewer than three previous failed attempts at establishing a secured connection. In the event that the remote access client 102 is a portable device, such as a mobile phone or a laptop, the policy may also include verifying whether the portable device is not on a list identifying lost or stolen portable terminals. As will be appreciated, the policy manager 302 extends authorisation of a given remote access client 102 associated with a given request for a secured connection beyond the authentication of the remote access client 102. The policies relating to the scrutiny of incoming secured connection requests can be tailored to the policies of a given terminating terminal, such as the private network 105.

In the event that the remote access client 102 satisfies the policies of the private network 105 and is successfully authenticated at step 1602, the VPN software processing component 301 allows the incoming request by establishing an initial SA with the remote access client 102 and generating key data, or keying data, comprising a set of keys in relation to the received secured connection request. As discussed above, the VPN software processing component 301 authenticates the remote access client 102 associated with the incoming request for a secured connection on the basis of an authentication parameter, such as Auth$_i$ per the example in FIG. 6. As will be appreciated from the above discussion, the authentication parameter utilised for authenticating a given remote access client 102 may be included in the incoming request for a secured connection, i.e. the key exchange initiation message, or may be transmitted to the VPN software processing component 301 in a further key exchange message transmitted by the remote access client 102.

As will also be appreciated from the discussion in relation to FIG. 6, the key data may be generated by the VPN software processing component 301 on the basis of data contained in the request initiation message for an encrypted communications channel or a further message transmitted by the remote access client 102 to the VPN software processing component 301.

In response to the successful generation of the key data in relation to the incoming request for an encrypted communications channel at step 1602, the VPN software processing component 301 is arranged to deliver the generated key data associated with a given incoming request for an encrypted communications channel to a terminating terminal identified as being associated with the incoming request for an encrypted communications channel at step 1603.

In the arrangement in which the incoming request for an encrypted communications channel is identified to be associated with the private network 105, the VPN software processing component 301 identifies an actual point of presence associated with the private network 105, such as the gateway 103 or the server 104.

In a further arrangement, such as where the gateway 103 is identified as the actual point of presence associated with the private network 105, the VPN software processing component 301 transmits the key data in relation to the allowed incoming request for an encrypted communications channel to the gateway 103. In response to receiving the key data, the gateway 103 encrypts any packets transmitted to the remote access client 102 with a key from the received key data. It will be understood that any packets transmitted by the remote access client 102 to the gateway 103 are be encrypted on the basis of a key from the key data, and that the gateway 103 utilises a key from the received key data to decrypt the contents of a received encrypted packet from the remote access client 102.

In a yet further arrangement, such as where the gateway 103 and the remote access client 102 require further SAs to be negotiated, the gateway 103, in response to receiving the key data, engages in a message exchange with the remote access client 102 to establish further SAs that are utilised to protect data communicated between the private network 105 and the remote access client 102 at step 1604. The gateway 103 secures a message transmitted to the remote access client 102 as part of the message exchange to establish further SAs on the basis of the key data supplied by the VPN software processing component 301 at step 1603. As will be appreciated from the passages in relation to FIGS. 6 to 12, the remote access client 102 has already generated the key data during the establishment of the initial SA, and also secures messages transmitted to the gateway 103 on the basis of such key data.

Since the initial SA between the private network 105 and the remote access client 102 is established via the global server 201, a communication message secured on the basis of the key data relating to the initial SA is also accessible to the global server 201. Therefore, a benefit of negotiating further SAs is that the global server 201 does not have access to communication keys developed for securing data communicated under such further SA. In addition, a secured connection protocol, such as IPsec, requires at least two unidirectional SAs to communicate, thus the further SA establishment is required for communicating data under such a protocol.

In the event that a secured connection has been established between a remote access client 102 and the private network 105, a message transmitted by the remote access client 102 to the private network 105 on the secured connection is received at the VPN software processing component 301 first, which then transmits the message to the identified actual point of presence of the private network 105. The VPN software processing component 301 is also responsible for routing a further message originating in the private network 105 to a corresponding remote access client 102.

Therefore, the VPN software processing component 301 receives messages transmitted on the secured connection, and routes the received encrypted packets on the basis of data identifying a relationship between a given encrypted communication channel, and a given initiating terminal and a given terminating terminal The VPN software processing component 301 may store the data identifying the relationship between the given encrypted communication channel, and the given initiating terminal and the given terminating terminal in a database or an internal memory. The VPN software processing component 301 may alternatively obtain the data identifying the relationship between the given encrypted communication channel, and the given initiating terminal and the given terminating terminal from the ISAKMP anti-clogging cookies mentioned above. As discussed above, the ISAKMP anti clogging cookies can be obtained from a header of an IKE message.

In a further embodiment, the policy manager 302 is arranged to selectively perform transmission of a received encrypted packet on the basis of certain predetermined communication conditions. For example an encrypted packet received on an established secured connection is transmitted to a corresponding private network 105, if the received encrypted packet satisfies the predetermined communication conditions. In one arrangement the communication condition is dependent on the integrity of a received encrypted packet. The policy manager 302 can verify the integrity of an unencrypted header of an encrypted packet to verify whether a given received encrypted packet satisfies the integrity requirements determined on the basis of the communication conditions. The communication conditions are specific to a terminating terminal, and are stored in the database DB1 of the global server 201 or an internal memory. If the received encrypted packet satisfies the communication conditions, the VPN software processing software 301 transmits the encrypted packet to a corresponding private network. However, if the communication condition is not satisfied, the received encrypted packet is dropped.

In at least some embodiments, the global server 201 further comprises middleware component 303. The middleware component 303 is arranged to convert the protocol of a received encrypted packet per a communication protocol of the identified terminating terminal, such as the private network 105. In the event that a received encrypted packet is determined to be based on a protocol that is different to the communication protocol of the associated private network 105, the middleware component 303 is arranged to generate a second encrypted packet using a second communication protocol such that the second communication protocol is different to the first communication protocol of the received encrypted packet. The middleware component 303 then transmits the second encrypted packet to the identified terminating terminal, such as a private network 105.

The middleware component 303 is further arranged to generate a further encrypted packet, in response to receiving an encrypted packet from the private network 105, per a communication protocol of the remote access client 102, if a further communication protocol of the received encrypted packet is different to the communication protocol of the remote access client 102.

The middleware component 303 is also arranged to generate a further key exchange message, if a communication protocol of a key exchange message is different from a further communication protocol of an identified terminating terminal associated with the received key exchange message.

The middleware component 303 is also arranged to remove any implementation specific parameters in a given packet that are incompatible with a corresponding communicating host. For example, if a vendor implements a vendor specific IKE message in the gateway 103 that is not compliant with a client software of the remote access client 102, the middleware component 303 removes any such inconsistent fields to ensure a packet received by a communicating host is compliant with a specific implementation of the secured connection at the communicating host terminal.

As described above, the VPN software processing component 301 routes an encrypted packet to a corresponding communicating host, as identified by the data identifying relationships between the communicating hosts 102, 105. In the event that the VPN software processing component 301 fails to deliver a packet to corresponding communicating host, or a terminating terminal, the VPN software processing component 301 can attempt re-transmission of the encrypted packet in response to a predetermined event. In the arrangement in which the predetermined event relates to an indication from a given corresponding communicating host that the given corresponding communicating host is able to receive the received encrypted packet. Such an indication may be generated in response to temporary connection problems, such as temporary loss of reception on a mobile device, experienced by the given corresponding communicating host. The predetermined event may also relate to a passage of a specified period of time.

When the remote access client 102 is a mobile communications device configured to communicate per next generation of wireless communications, the remote access client 102 is associated with a current point of attachment, such that the current point of attachment identifies a current point of association of the remote access client 102 to the communications network 101. Such a remote access client 102 is associated with a home agent that is accessible via the communications network 101 and is arranged to hold data in relation to the remote access client 102. In such arrangements, the VPN software processing component 301 authenticates the remote access client on the basis of data derived from the home agent, in response to receiving an encrypted communication channel request from the remote access client 102.

As is well known in the art, mobile communications devices are prone to connectivity issues on secured connections owing to the fact that a given mobile communications device may change a current point of attachment whilst communicating on a secured connection, which leads to packets being undeliverable until the changed point of attachment is communicated to a corresponding node. In such scenarios, VPN software processing component 301 can identify a current point of attachment associated with the mobile communications device, on the basis of data derived from the home agent. Therefore, in the event that a given mobile communications device changes a point of attachment, the VPN software processing component 301 determines a changed point of attachment on the basis of data derived from the home agent.

In the event that a remote access client 102 is a mobile communications device and delivery of a given encrypted packet to the remote access client 102 has failed, the VPN software processing component 301 attempts to retransmit the given encrypted packet on the basis of availability, at the home agent, the data identifying a new point of attachment associated with the remote access client 102.

Figure 17:
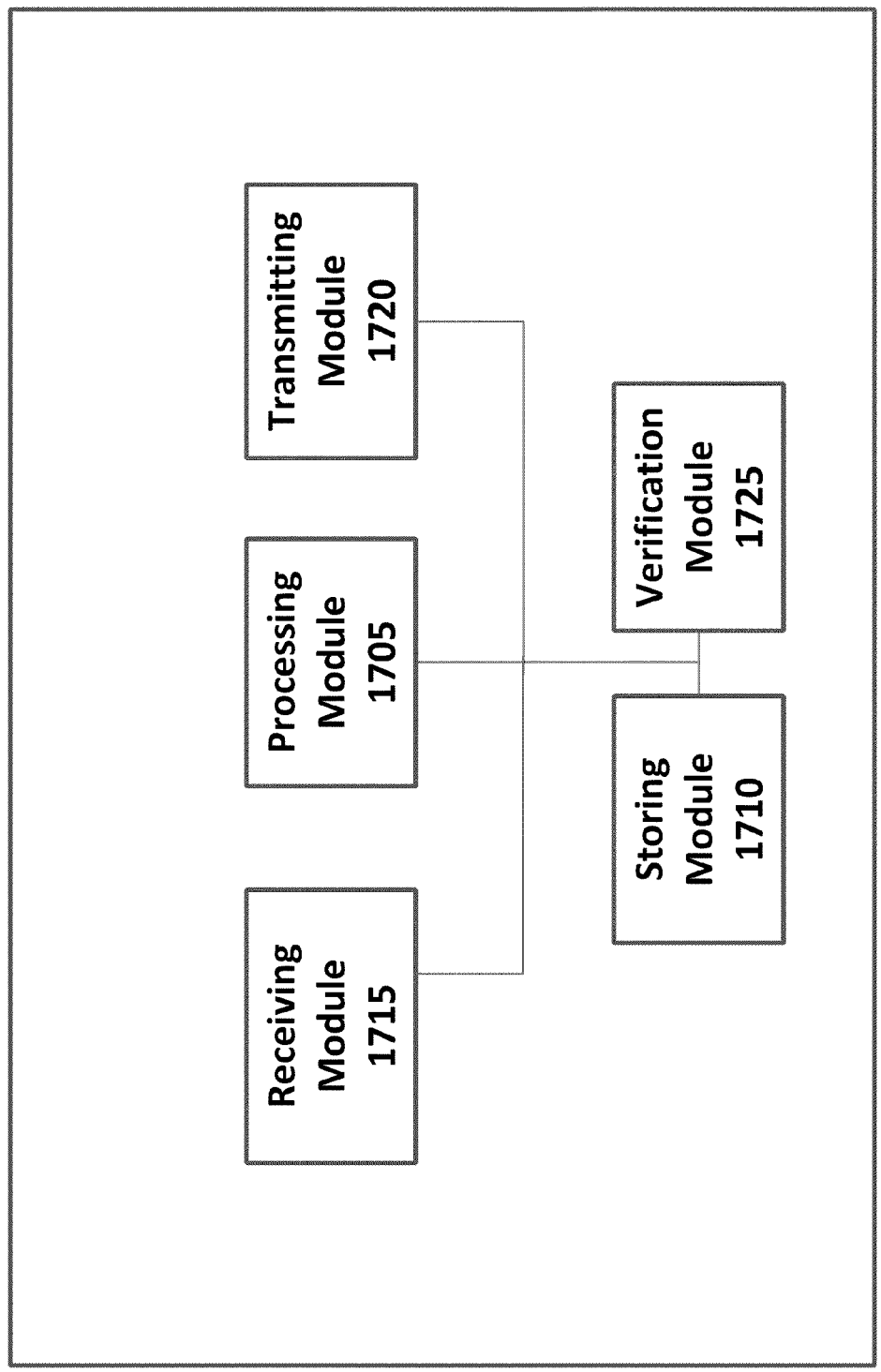
FIG. 17 is a functional block diagram of an exemplary global server.

The functionality described herein (e.g., with regard to one or more of the accompanying figures) may correspond in some aspects to similarly designated "means for" functionality in the appended claims. Referring to FIG. 17, the global server 201 is represented as a series of interrelated functional modules.

FIG. 17 is a functional block diagram of an exemplary global server 201. As shown, the global server 201 may comprise a processing module 1705, a storing module 1710, a receiving module 1715, a transmitting module 1720, and a verification module 1725. The processing module 1705 may correspond at least in some aspects to, for example, a processor and/or VPN processing software as discussed herein. The storing module 1710 may correspond at least in some aspects to, for example, a memory as discussed herein. The receiving module 1715 may correspond at least in some aspects to, for example, a processor, a receiver, a transceiver and/or VPN processing software as discussed herein. The transmitting module 1720 may correspond at least in some aspects to, for example, a processor, a transmitter, a transceiver and/or VPN processing software as discussed herein. The verification module 1725 may correspond at least in some aspects to, for example, a processor and/or VPN processing software.

The functionality of the modules of FIG. 17 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

The aforementioned example embodiments described above can be implemented in many ways, such as program instructions for execution by a processor, as logic circuits, as an application specific integrated circuit, as firmware, etc. For example, the embodiments can be implemented as one or more software or firmware applications, computer-implemented methods, program products stored on a computer useable medium, for execution on one or more processors (e.g., CPU, microcontroller) or other computing devices in a wireless station.

The above embodiments are to be understood as illustrative examples of the invention. Further embodiments of the invention are envisaged. For example, whilst the embodiments of the invention have been implemented on a single network entity, it will be understood that the embodiments of the invention can be implemented on a plurality of network entities which are interconnected by the communications network.

It will also be appreciated that the various components and means of the network entity may reside on a cluster of individual entities such that the cluster of individual entities appears as a single entity to an external entity.

It will be understood that whilst the embodiments of the invention have been implemented on the basis of a key exchange protocol, the embodiments of the invention can be implemented on any encrypted communication channel setup process, where the authentication of an initiating terminal can be performed by a proxy negotiator.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A server, external to a private network, for providing a client terminal with authenticated access to a service provided by a terminating terminal that is within the private network, the server comprising:
   a communication module;
   a data store comprising software; and one or more processors in data communication with the communication module and the data store, the one or more processors being configured to execute the software and cause the server that is external to the private network to:

receive a first key exchange initiation message from the client terminal, wherein the client terminal is external to the private network;

authenticate the client terminal based on the first key exchange initiation message;

establish, on behalf of the private network, a security association between the server and the client terminal based on the first key exchange initiation message;

generate keying data corresponding to the established security association; and transmit the keying data to the terminating terminal that is within the private network, wherein the keying data is configured to be used by the terminating terminal that is within the private network to establish an encrypted communications channel between the client terminal and the terminating terminal that is within the private network.

2. The server according to claim 1, wherein the one or more processors are configured to execute the software and further cause the server to authenticate the client terminal based at least in part on an authentication parameter received from the client terminal.

3. The server according to claim 2, wherein the authentication parameter is contained in a further message.

4. The server according to claim 1, wherein the one or more processors are configured to execute the software and further cause the server to identify the terminating terminal based at least in part on identifying data specifying a relationship between the client terminal and at least one of the private network or the terminating terminal.

5. The server according to claim 1, wherein the one or more processors are configured to execute the software and further cause the server to generate the keying data based at least in part on the first key exchange initiation message.

6. The server according to claim 1, wherein the one or more processors are configured to execute the software and further cause the server to generate the keying data based at least in part on the first key exchange initiation message and a keying data generation parameter.

7. The server according to claim 1, wherein the one or more processors are configured to execute the software and further cause the server to generate the keying data based at least in part on the first key exchange initiation message and a further message, the further message comprising a keying data generation parameter.

8. The server according to claim 1, wherein the one or more processors are configured to execute the software and further cause the server to transmit the keying data to the terminating terminal via a secure communications channel established between the server and the terminating terminal that is within the private network.

9. The server according to claim 1, wherein the one or more processors are configured to execute the software and further cause the server to establish an encrypted communications channel with the terminating terminal on the basis of at least one predetermined condition.

10. The server according to claim 9, wherein the predetermined condition comprises the client terminal having been scanned for the presence of malicious software.

11. The server according to claim 9, wherein the predetermined condition comprises the client terminal having been allowed to establish a previous encrypted communications channel with the terminating terminal.

12. The server according to claim 1, wherein the one or more processors are configured to execute the software and further cause the server to:

receive a first encrypted packet from the client terminal; and transmit the first encrypted packet to the terminating terminal via an established secured communications channel.

13. The server according to claim 12, wherein the one or more processors are configured to execute the software and further cause the server to transmit the first encrypted packet to the terminating terminal if at least one predetermined communication condition is satisfied.

14. The server according to claim 13, wherein the predetermined communication condition comprises verification of the integrity of the first encrypted packet.

15. The server according to claim 1, wherein the one or more processors are configured to execute the software and further cause the server to:

receive a first encrypted packet from the client terminal using a first communication protocol;

generate a second encrypted packet in response to receipt of the first encrypted packet; and transmit the second encrypted packet to the terminating terminal via an established encrypted communications channel between the client terminal and the terminating terminal using a second communication protocol, wherein the second communication protocol is different from the first communication protocol.

16. The server according to claim 1, wherein the one or more processors are configured to execute the software and further cause the server to:

receive an encrypted packet from the terminating terminal; and transmit the encrypted packet to the client terminal via an established encrypted communications channel.

17. The server according to claim 1, wherein the one or more processors are configured to execute the software and further cause the server to:

receive a first encrypted packet from the terminating terminal using a first communication protocol;

generate a second encrypted packet in response to receipt of the first encrypted packet; and transmit the second encrypted packet to the client terminal via an established encrypted communications channel between the client terminal and the terminating terminal, wherein the second communication protocol is different from the first communication protocol.

18. The server according to claim 1, wherein the one or more processors are configured to execute the software and further cause the server to:

generate a second key exchange initiation message; and transmit the second key exchange initiation message to the terminating terminal using a communication protocol different from the communication protocol used to receive the first key exchange initiation message.

19. The server according to claim 1, wherein the one or more processors are configured to execute the software and further cause the server to:

authenticate the client terminal based on data received from a home agent, wherein the home agent is configured to store data in relation to the client terminal.

20. The server according to claim 19, wherein the one or more processors are configured to execute the software and further cause the server to determine a changed point of attachment of the client terminal based on the data received from the home agent.

21. The server according to claim 16, wherein the one or more processors are configured to execute the software and further cause the server to retransmit the encrypted packet to the client terminal via the established encrypted communications channel in response to a failure to deliver the encrypted packet to the client terminal.

22. The server according to claim 16, wherein the one or more processors are configured to execute the software and further cause the server to retransmit the encrypted packet to the client terminal via the established encrypted communications channel in response to a failure to deliver the encrypted packet to the client terminal and receipt of an indication from the client terminal that the client terminal is able to receive the encrypted packet.

23. The server according to claim 21, wherein the one or more processors are configured to execute the software and further cause the server to:
authenticate the client terminal based on data received from a home agent; and
determine a changed point of attachment of the client terminal based on data received from the home agent,
wherein the home agent is configured to store data related to the client terminal.

24. The server according to claim 16, wherein the one or more processors are configured to execute the software and further cause the server to retransmit the encrypted packet to the client terminal via the established encrypted communications channel in response to a failure to deliver the encrypted packet to the client terminal and a passing of a predetermined period of time.

25. A method of establishing an encrypted communications channel between a client terminal and a terminating terminal that is within a private network, the method comprising:
receiving, at a server that is external to the private network, a first key exchange message comprising an authentication parameter from the client terminal, wherein the client terminal is external to the private network;
verifying, at the server, the authentication parameter;
establishing, at the server, on behalf of the private network, a security association between the server and the client terminal based on the first key exchange message;
generating, at the server, keying data corresponding to the established security association; and
transmitting, from the server, the keying data to the terminating terminal that is within the private network,
wherein the keying data is configured for use by the terminating terminal that is within the private network in order to establish an encrypted communications channel between the client terminal and the terminating terminal that is within the private network.

26. The method according to claim 25, wherein the first key exchange message is a key exchange initiation message.

27. The method according to claim 25, further comprising identifying the terminating terminal based at least in part on identifying data specifying a relationship between the client terminal and at least one of the private network or the terminating terminal.

28. The method according to claim 25, further comprising generating the keying data based at least in part on the first key exchange message.

29. The method according to claim 26, further comprising deriving the keying data based at least in part on the key exchange initiation message.

30. The method according to claim 25, further comprising transmitting the keying data to the terminating terminal via an encrypted communications channel.

31. The method according to claim 25, further comprising denying the client terminal access to the terminating terminal on the basis of at least one predetermined condition not being satisfied.

32. The method according to claim 31, wherein the predetermined condition comprises the client terminal being scanned for the presence of malicious software.

33. The method according to claim 31, wherein the predetermined condition comprises the client terminal being allowed to establish the encrypted communications channel.

34. The method according to claim 25, further comprising:
receiving a first encrypted packet from the client terminal; and
transmitting the first encrypted packet to the terminating terminal via an established encrypted communications channel.

35. The method according to claim 34, further comprising transmitting the first encrypted packet to the terminating terminal if at least one predetermined communication condition is satisfied.

36. The method according to claim 35, wherein the predetermined communication condition comprises verification of the integrity of the first encrypted packet.

37. The method according to claim 25, further comprising:
receiving a first encrypted packet from the client terminal using a first communication protocol;
generating a second encrypted packet in response to receipt of the first encrypted packet; and
transmitting the second encrypted packet to the terminating terminal via an established encrypted communications channel between the client terminal and the terminating terminal using a second communication protocol,
wherein the second communication protocol is different from the first communication protocol.

38. The method according to claim 25, further comprising:
receiving an encrypted packet from the terminating terminal; and
transmitting the encrypted packet to the client terminal via an established encrypted communications channel.

39. The method according to claim 25, the method further comprising:
receiving a first encrypted packet from the terminating terminal using a first communication protocol;
generating a second encrypted packet in response to receiving the first encrypted packet; and
transmitting the second encrypted packet to the client terminal via an established encrypted communications channel between the client terminal and the terminating terminal.

40. The method according to claim 25, further comprising:
generating a second key exchange message; and
transmitting the second key exchange message to the terminating terminal using a communication protocol different from the communication protocol used when receiving the first key exchange message.

41. The method according to claim 25, further comprising:
authenticating the client terminal based on data received from a home agent,
wherein the home agent is configured to store data in relation to the client terminal.

42. The method according to claim 41, further comprising determining a changed point of attachment of the client terminal based on the data derived from the home agent.

43. The method according to claim 38, further comprising retransmitting the encrypted packet to the client terminal in response to a failure to deliver the encrypted packet to the client terminal.

44. The method according to claim 43, further comprising retransmitting the encrypted packet to the client terminal via the established encrypted communication channel in response to a failure to deliver the encrypted packet to the client terminal and receiving an indication from the client terminal that the client terminal is able to receive the encrypted packet.

45. The method according to claim 43, further comprising:
authenticating the client terminal based on data received from a home agent; and
determining a changed point of attachment of the client terminal based on the data received from the home agent, wherein the home agent is configured to store data related to the client terminal.

46. The method according to claim 45, further comprising retransmitting the encrypted packet to the client terminal via the established encrypted communication channel in response to a failure to deliver the encrypted packet to the client terminal and a passing of a specified period of time.

47. A non-transitory computer-readable medium comprising computer-executable instructions, which, when executed by a processor, cause a computing device to perform a method of establishing an encrypted communications channel between a client terminal and a terminating terminal that is within a private network, the method comprising:
receiving, at a server that is external to the private network, a first key exchange message comprising an authentication parameter from the client terminal, wherein the client terminal is external to the private network;
verifying, at the server, the authentication parameter;
establishing, at the server, on behalf of the private network, a security association between the sever and the client terminal based on the key exchange message;
generating, at the server, keying data corresponding to the established security association; and
transmitting, from the server, the keying data to the terminating terminal that is within the private network,
wherein the keying data is configured for use by the terminating terminal that is within the private network to establish an encrypted communications channel between the client terminal and the terminating terminal that is within the private network.

48. A server, external to a private network, for providing a client terminal with authenticated access to a service provided by a terminating terminal that is within the private network, the server comprising:
a receiving module configured to receive a key exchange message comprising an authentication parameter from the client terminal, wherein the client terminal is external to the private network;
a verification module configured to verify the authentication parameter;
a processing module configured to:
establish, on behalf of the private network, a security association between the server that is external to the private network and the client terminal based on the key exchange message; and
generate keying data corresponding to the established security association; and
a transmitting module configured to transmit the keying data to the terminating terminal that is within the private network,
wherein the keying data is configured for use by the terminating terminal that is within the private network to establish an encrypted communications channel between the client terminal and the terminating terminal that is within the private network.

* * * * *